(12) United States Patent
Kubota et al.

(10) Patent No.: US 11,446,561 B2
(45) Date of Patent: Sep. 20, 2022

(54) NON-TRANSITORY COMPUTER READABLE RECORDING MEDIUM, SCREEN GENERATING METHOD, AND INFORMATION PROCESSING APPARATUS

(71) Applicant: FUJITSU LIMITED, Kawasaki (JP)

(72) Inventors: Kazumi Kubota, Kawasaki (JP); Hirohisa Naito, Fuchu (JP); Tsuyoshi Matsumoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 16/932,840

(22) Filed: Jul. 20, 2020

(65) Prior Publication Data

US 2020/0346095 A1 Nov. 5, 2020

Related U.S. Application Data

(63) Continuation of application No. PCT/JP2018/002169, filed on Jan. 24, 2018.

(51) Int. Cl.
*A63B 71/06* (2006.01)
*A63B 24/00* (2006.01)

(52) U.S. Cl.
CPC ...... *A63B 71/0669* (2013.01); *A63B 24/0021* (2013.01); *A63B 2024/0025* (2013.01);
(Continued)

(58) Field of Classification Search
CPC ............ A63B 71/0669; A63B 24/0021; A63B 2024/0025; A63B 2071/0694; A63B 2220/05; A63B 2220/806
See application file for complete search history.

(56) References Cited

U.S. PATENT DOCUMENTS 8,766,977 B2 * 7/2014 Kim ........................ G06T 13/40
382/154
9,463,388 B2 * 10/2016 Thompson ........... H04N 21/812
(Continued)

FOREIGN PATENT DOCUMENTS

JP 2004-109264 A 4/2004
JP 2011-081431 A 4/2011
(Continued)

OTHER PUBLICATIONS

International Search Report and Written Opinion dated Apr. 24, 2018 for PCT/JP2018/002169 filed on Jan. 24, 2018, 8 pages including English Translation of the International Search Report.
(Continued)

*Primary Examiner* — Malina D. Blaise
(74) *Attorney, Agent, or Firm* — Xsensus LLP

(57) ABSTRACT

An information processing apparatus 100 acquires, when an actual performance by an athlete is started, an element that has already been performed and a score of the element that has already been performed in the actual performance, based on data acquired in real time. The information processing apparatus 100 estimates an element with a high probability of being performed hereafter in the actual performance, based on at least one of the planned performance information and the data. The information processing apparatus 100 estimates an estimated score of the actual performance being performed, based on the score of the element that has already been performed and an estimated score in the case in which estimated elements that have not been performed succeed, and generates screen information to display the estimated score of planned performance and the estimated score of the actual performance.

9 Claims, 24 Drawing Sheets

(52) U.S. Cl.
CPC ... *A63B 2071/0694* (2013.01); *A63B 2220/05* (2013.01); *A63B 2220/806* (2013.01)

(56) References Cited

U.S. PATENT DOCUMENTS

| | | | | |
|---|---|---|---|---|
| 10,460,451 | B2* | 10/2019 | Yamagiwa | G06V 40/25 |
| 2008/0189634 | A1* | 8/2008 | Tevanian | G06Q 40/06 |
| | | | | 715/764 |
| 2009/0220124 | A1* | 9/2009 | Siegel | G06T 7/292 |
| | | | | 382/103 |
| 2011/0081634 | A1 | 4/2011 | Kurata et al. | |
| 2012/0143358 | A1* | 6/2012 | Adams | A63F 13/814 |
| | | | | 700/92 |
| 2012/0214594 | A1* | 8/2012 | Kirovski | A63F 13/213 |
| | | | | 463/36 |
| 2014/0067096 | A1* | 3/2014 | Al | G06Q 10/0639 |
| | | | | 700/91 |
| 2014/0257744 | A1* | 9/2014 | Lokshin | A61B 5/6813 |
| | | | | 702/141 |
| 2014/0287388 | A1* | 9/2014 | Ferrier | G09B 19/0038 |
| | | | | 434/247 |
| 2015/0227652 | A1* | 8/2015 | Aonuma | G06V 40/23 |
| | | | | 703/11 |
| 2015/0375117 | A1* | 12/2015 | Thompson | A63F 13/79 |
| | | | | 463/9 |
| 2016/0008723 | A1* | 1/2016 | Thompson | H04N 21/812 |
| | | | | 463/31 |
| 2016/0086500 | A1* | 3/2016 | Kaleal, III | A61B 5/43 |
| | | | | 434/257 |
| 2016/0210690 | A1* | 7/2016 | Tisler | G06Q 30/08 |
| 2016/0217325 | A1* | 7/2016 | Bose | G11B 27/17 |
| 2016/0220867 | A1* | 8/2016 | Flaherty | G16H 20/30 |
| 2017/0147872 | A1* | 5/2017 | Maroy | A63F 13/833 |
| 2017/0189784 | A1* | 7/2017 | Sasaki | G09B 19/003 |
| 2017/0332946 | A1* | 11/2017 | Kikkeri | A61B 5/1116 |
| 2018/0140927 | A1* | 5/2018 | Kito | G16H 20/30 |
| 2018/0154239 | A1* | 6/2018 | Butler | G16H 20/30 |
| 2019/0034976 | A1* | 1/2019 | Hamedi | G06Q 30/0243 |
| 2019/0172367 | A1* | 6/2019 | Vuillerme | G09B 19/003 |
| 2019/0220657 | A1* | 7/2019 | Yabuki | G06T 7/73 |

FOREIGN PATENT DOCUMENTS

| | | |
|---|---|---|
| JP | 2012-042287 A | 3/2012 |
| JP | 2015-228183 A | 12/2015 |
| WO | 2016/092933 A1 | 6/2016 |

OTHER PUBLICATIONS

Extended European Search Report dated Dec. 23, 2020 for corresponding European patent application No. 18902325.2.
Gritai, et al. "Tracking of Human Body Joints Using Anthropometry", XP032964923, pp. 1037-1040, Jul. 9, 2006.
Jeongeun Shin, et al., "A study on motion analysis of an artistic gymnastics by using dynamic image processing—for a development of automatic scoring system of horizontal bar-", pp. 1037-1042, XP055617277, May 15, 2008.
Hui Zhang, et al. "Grading Tai Chi Performance in Competition with RGBD Sensors", XP055723233, Jan. 1, 2015, Retrieved from the Internet: URL: https: https://link.springer.com/chapter/10.1007/978-3-319-16181-5_1.pdf [Retrieved on Aug. 18, 2020].

* cited by examiner

| FRAME NUMBER | SENSING FRAME |
|---|---|
| 1 | SENSING FRAME CORRESPONDING TO FRAME NUMBER "1" |
| 2 | SENSING FRAME CORRESPONDING TO FRAME NUMBER "2" |
| 3 | SENSING FRAME CORRESPONDING TO FRAME NUMBER "3" |
| ... | ... |

FIG.5

| FRAME NUMBER | X0 | Y0 | Z0 | ... | X17 | Y17 | Z17 |
|---|---|---|---|---|---|---|---|
| 1 | 100 | 20 | 0 | | 200 | 40 | 5 |
| 2 | 101 | 25 | 5 | | 202 | 39 | 15 |
| 3 | 110 | 32 | 7 | | 210 | 45 | 12 |
| ... | | | | | | | |
| 100 | 201 | 125 | 30 | | 225 | 150 | 10 |
| ... | | | | | | | |
| 1 | 100 | 21 | 0 | ... | 210 | 45 | 0 |
| ... | | | | | | | |

FIG.6

| ELEMENT GROUP | ELEMENT NUMBER | ELEMENT NAME | START POSITION | REQUIREMENT FOR START POSITION | FINISH POSITION | REQUIREMENT FOR FINISH POSITION |
|---|---|---|---|---|---|---|
| G3 | 53 | BACK UPRISE MALTESE (2 SEC) | BACK UPRISE | REQUIREMENT FOR "BACK UPRISE" | MALTESE (2 SEC) | REQUIREMENT FOR "MALTESE (2 SEC)" |
| G3 | 70 | BACK UPRISE SWALLOW (2 SEC) | BACK UPRISE | REQUIREMENT FOR "BACK UPRISE" | SWALLOW (2 SEC) | REQUIREMENT FOR "SWALLOW (2 SEC)" |
| G2 | 52 | AZARIAN | LAYOUT BACK ROLL WITH STRAIGHT ARMS | REQUIREMENT FOR "LAYOUT BACK ROLL WITH STRAIGHT ARMS" | CROSS (2 SEC) | REQUIREMENT FOR "CROSS (2 SEC)" |

FIG.8

| FRAME NUMBER | JOINT POSITION DATA | START POSITION FLAG | FINISH POSITION FLAG | ELEMENT GROUP | ELEMENT NUMBER | ELEMENT NAME |
|---|---|---|---|---|---|---|
| 1 | 3D COORDINATES OF JOINT POSITION OF FRAM NUMBER "1" | 1 | 0 | G3 | 53 | BACK UPRISE MALTESE (2 SEC) |
| 2 | 3D COORDINATES OF JOINT POSITION OF FRAM NUMBER "2" | 0 | 0 | G3 | 53 | BACK UPRISE MALTESE (2 SEC) |
| 3 | 3D COORDINATES OF JOINT POSITION OF FRAM NUMBER "3" | 0 | 0 | G3 | 53 | BACK UPRISE MALTESE (2 SEC) |
| ⋮ | | | | | | |
| 15 | 3D COORDINATES OF JOINT POSITION OF FRAM NUMBER "15" | 0 | 1 | G3 | 53 | BACK UPRISE MALTESE (2 SEC) |
| 16 | 3D COORDINATES OF JOINT POSITION OF FRAM NUMBER "16" | 1 | 0 | G2 | 52 | AZARIAN |
| 17 | 3D COORDINATES OF JOINT POSITION OF FRAM NUMBER "17" | 0 | 0 | G2 | 52 | AZARIAN |
| ⋮ | | | | | | |

EVENT HORIZONTAL BAR  NO. 001  ATHLETE FUJI, Taro

10a: [LIVE image]

10b:
| Skill | | | |
|---|---|---|---|
| BACK UPRISE MALTESE (2 SEC) | G3 | 53 | E |
| BACK UPRISE SWALLOW (2 SEC) | G3 | 70 | D |
| AZARIAN: LAYOUT BACK ROLL WITH STRAIGHT ARMS TO CROSS (2 SEC) | G2 | 52 | D |
| BACK UPRISE TO HANDSTAND (2 SEC) | G1 | 87 | C |
| JONASAN: FRONT DOUBLE SAULT PIKED TO HANG | G1 | 52 | D |
| YAMAWAKI: FRONT DOUBLE SAULT TUCKED | G1 | 51 | C |
| HONMA TO CROSS: FRONT SAULT AT RING HEIGHT DIRECTLY TO CROSS (2 SEC) | G3 | 16 | D |
| FELGE TO HANDSTAND (2 SEC) | G1 | 81 | C |
| STRAIGHT ARM FELGE THROUGH HANDSTAND | G1 | 26 | B |
| BACK DOUBLE DOUBLE TUCKED DISMOUNT | G4 | 41 | E |

10c: ESTIMATED D SCORE  5.700
10d: ESTIMATED E SCORE  7.200
10e: ESTIMATED SCORE  12.900

PLACE ESTIMATION

| | | | |
|---|---|---|---|
| 1 | YAMADA, Taro | 13.450 | - |
| 2 | FUJI, Taro | 12.900 | - |
| 3 | YAMADA, Ichiro | 13.300 | - |

EVENT HORIZONTAL BAR  NO. 001  ATHLETE  FUJI, Taro 12a (LIVE video)

| | | | |
|---|---|---|---|
| BACK UPRISE MALTESE (2 SEC) | G3 | 53 | E |
| AZARIAN: LAYOUT BACK ROLL WITH STRAIGHT ARMS TO CROSS (2 SEC) | G2 | 52 | D |
| BACK UPRISE TO INVERTED CROSS (2 SEC) | G3 | 94 | D |
| BACK UPRISE TO HANDSTAND (2 SEC) | G1 | 87 | C |
| JONASAN: FRONT DOUBLE SAULT PIKED TO HANG | G1 | 52 | D |
| YAMAWAKI: FRONT DOUBLE SAULT TUCKED | G1 | 51 | C |
| HONMA TO CROSS: FRONT SAULT AT RING HEIGHT DIRECTLY TO CROSS (2 SEC) | G3 | 16 | D |
| FELGE TO HANDSTAND (2 SEC) | G1 | 81 | C |
| STRAIGHT ARM FELGE THROUGH HANDSTAND | G1 | 26 | B |
| BACK DOUBLE DOUBLE TUCKED DISMOUNT | G4 | 41 | E |

ESTIMATED D SCORE  5.700
ESTIMATED E SCORE  8.300
ESTIMATED SCORE  14.000

PLACE ESTIMATION

| 1 | FUJI, Taro | 14.000 | ↑ |
| 2 | YAMADA, Taro | 13.450 | ↓ |
| 3 | YAMADA, Ichiro | 13.300 | |

| FRAME NUMBER | VIDEO FRAME |
|---|---|
| 1 | VIDEO FRAME CORRESPONDING TO FRAME NUMBER "1" |
| 2 | VIDEO FRAME CORRESPONDING TO FRAME NUMBER "2" |
| 3 | VIDEO FRAME CORRESPONDING TO FRAME NUMBER "3" |
| ... | ... |

FIG.14

| ATHLETE ID | DATE | COMPETITION ID | PERFORMANCE ROUTINE INFORMATION | SCORE | PERFORMANCE TIME |
|---|---|---|---|---|---|
| U1001 | May 21, 2017 | A101 | INFORMATION ABOUT ROUTINE PERFORMED BY ATHLETE ID "1001" IN COMPETITION OF COMPETITION ID "A101" | SCORE: 14.00<br>D SCORE: 5.70<br>E SCORE: 8.30 | 55 SEC |
| U1001 | May 21, 2017 | A102 | INFORMATION ABOUT ROUTINE PERFORMED BY ATHLETE ID "1001" IN COMPETITION OF COMPETITION ID "A102" | SCORE: 12.90<br>D SCORE: 5.70<br>E SCORE: 7.20 | 57 SEC |
| ... | ... | ... | ... | ... | ... |

| ORDER | ELEMENT NAME | ELEMENT GROUP | ELEMENT NUMBER | DIFFICULTY |
|---|---|---|---|---|
| 1 | BACK UPRISE MALTESE (2 SEC) | G3 | 53 | E |
| 2 | AZARIAN: LAYOUT BACK ROLL WITH STRAIGHT ARMS TO CROSS (2 SEC) | G2 | 52 | D |
| 3 | BACK UPRISE TO INVERTED CROSS (2 SEC) | G3 | 94 | D |
| 4 | BACK UPRISE TO HANDSTAND (2 SEC) | G1 | 87 | C |
| 5 | JONASAN: FRONT DOUBLE SAULT PIKED TO HANG | G1 | 52 | D |
| 6 | YAMAWAKI: FRONT DOUBLE SAULT TUCKED | G1 | 51 | C |
| 7 | HONMA TO CROSS: FRONT SAULT AT RING HEIGHT DIRECTLY TO CROSS (2 SEC) | G3 | 16 | D |
| 8 | FELGE TO HANDSTAND (2 SEC) | G1 | 81 | C |
| 9 | STRAIGHT ARM FELGE THROUGH HANDSTAND | G1 | 26 | B |
| 10 | BACK DOUBLE DOUBLE TUCKED DISMOUNT | G4 | 41 | E |

| ATHLETE ID | ESTIMATED SCORE | SCORE |
|---|---|---|
| U1001 | SCORE: 14.00<br>D SCORE: 5.70<br>D SCORE: 8.30 | SCORE: 15.10<br>D SCORE: 6.80<br>D SCORE: 8.30 |
| U1002 | SCORE: 14.00<br>D SCORE: 5.70<br>D SCORE: 8.30 | SCORE: 13.80<br>D SCORE: 5.60<br>D SCORE: 8.20 |
| ... | ... | ... |

| ELEMENT GROUP | ELEMENT NUMBER | DIFFICULTY | SCORE |
|---|---|---|---|
| G3 | 53 | E | 0.5 |
| G3 | 70 | D | 0.4 |
| G2 | 52 | D | 0.4 |
| G3 | 94 | D | 0.4 |
| G1 | 87 | C | 0.3 |
| ... | | | |

| Skill | Group | Value | Difficulty |
|---|---|---|---|
| BACK UPRISE MALTESE (2 SEC) | G3 | 53 | E |
| BACK UPRISE SWALLOW (2 SEC) | G3 | 70 | D |
| AZARIAN: LAYOUT BACK ROLL WITH STRAIGHT ARMS TO CROSS (2 SEC) | G2 | 52 | D |
| BACK UPRISE TO HANDSTAND (2 SEC) | G1 | 87 | C |
| JONASAN: FRONT DOUBLE SAULT PIKED TO HANG | G1 | 52 | D |
| YAMAWAKI: FRONT DOUBLE SAULT TUCKED | G1 | 51 | C |
| HONMA TO CROSS: FRONT SAULT AT RING HEIGHT DIRECTLY TO CROSS | G3 | 16 | D |
| FELGE TO HANDSTAND (2 SEC) | G1 | 81 | C |
| STRAIGHT ARM FELGE THROUGH HANDSTAND | G1 | 26 | B |
| BACK DOUBLE DOUBLE TUCKED DISMOUNT | G4 | 41 | E |

⇨

11a-2

| Skill | Group | Value | Difficulty |
|---|---|---|---|
| BACK UPRISE MALTESE (2 SEC) | G3 | 53 | E |
| AZARIAN: LAYOUT BACK ROLL WITH STRAIGHT ARMS TO CROSS (2 SEC) | G2 | 52 | D |
| BACK UPRISE TO INVERTED CROSS (2 SEC) | G3 | 94 | D |
| BACK UPRISE TO HANDSTAND (2 SEC) | G1 | 87 | C |
| JONASAN: FRONT DOUBLE SAULT PIKED TO HANG | G1 | 52 | D |
| YAMAWAKI: FRONT DOUBLE SAULT TUCKED | G1 | 51 | C |
| HONMA TO CROSS: FRONT SAULT AT RING HEIGHT DIRECTLY TO CROSS (2 SEC) | G3 | 16 | D |
| FELGE TO HANDSTAND (2 SEC) | G1 | 81 | C |
| STRAIGHT ARM FELGE THROUGH HANDSTAND | G1 | 26 | B |
| BACK DOUBLE DOUBLE TUCKED DISMOUNT | G4 | 41 | E |

FIG.23

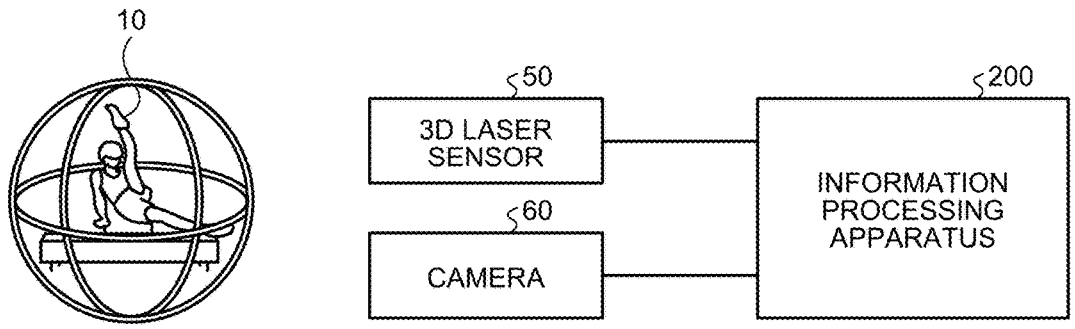

FIG.24

| ELEMENT GROUP | ELEMENT NUMBER | ELEMENT NAME | START POSITION | FINISH POSITION (HOLD) |
|---|---|---|---|---|
| G3 | 53 | BACK UPRISE MALTESE (2 SEC) | BACK UPRISE | MALTESE (2 SEC) |
| G3 | 70 | BACK UPRISE SWALLOW (2 SEC) | BACK UPRISE | SWALLOW (2 SEC) |
| G2 | 52 | AZARIAN:LAYOUT BACK ROLL WITH STRAIGHT ARMS TO CROSS (2 SEC) | LAYOUT BACK ROLL WITH STRAIGHT ARMS | CROSS (2 SEC) |
| G3 | 94 | BACK UPRISE TO INVERTED CROSS (2 SEC) | BACK UPRISE | INVERTED CROSS (2 SEC) |
| G1 | 87 | BACK UPRISE TO HANDSTAND (2 SEC) | BACK UPRISE | HANDSTAND (2 SEC) |

NON-TRANSITORY COMPUTER READABLE RECORDING MEDIUM, SCREEN GENERATING METHOD, AND INFORMATION PROCESSING APPARATUS

CROSS-REFERENCE TO RELATED APPLICATION

This application is a continuation application of International Application PCT/JP2018/02169 filed on Jan. 24, 2018 and designating U.S., the entire contents of which are incorporated herein by reference.

FIELD

The present invention relates to a screen generating program and the like.

BACKGROUND ART (BACKGROUND)

In events scored by judges, athletes give performance composed of multiple elements. Composition of a routine performed by an athlete is often fixed to some extent through a season. Therefore, it is possible to estimate the routine in a practice before a match, in a preliminary match, in a match performance, and the like, and to estimate scores for the performances also.

Patent Literature 1: Japanese Laid-open Patent Publication No. 2004-109264
Patent Literature 2: Japanese Laid-open Patent Publication No. 2012-042287
Patent Literature 3: Japanese Laid-open Patent Publication No. 2015-228183
Patent Literature 2: Japanese Laid-open Patent Publication No. 2011-081431

However, with the conventional techniques described above, there is a problem that an estimated score of a planned performance and an estimated score as the performance proceeds are not provided in events scored by judges.

For example, there is a case in which an athlete raises the level of difficulty of an element to move up to a higher place, or a case in which planned routine is partially changed according to a condition on the day of a match. Moreover, there is a case in which an athlete changes some of elements during a performance on his/her own decision. In such a case, because the routine is different from what has been assumed, it is difficult to estimate the score of the performance.

SUMMARY

According to an aspect of the embodiment of the invention, a non-transitory computer readable recording medium stores a screen generating program that causes a computer to execute a process including: acquiring planned performance information that includes a plurality of elements to be performed by an athlete of an event scored by judges; calculating a first estimated score in a case in which the elements succeed, from the planned performance information; generating screen information to display the first estimated score of the planned performance information; acquiring, when an actual performance by the athlete is started, an element that has already been performed in the actual performance and a score of the element that has already been performed, based on data acquired by sensing the actual performance in real time; first estimating an element with a high probability of being performed hereafter in the actual performance, based on at least one of the planned performance information and the data; second estimating a third estimated score of the entire actual performance being performed, based on the score of the element that has already been performed and a second estimated score in a case in which the estimated elements that have not been performed succeed; and generating screen information to display the first estimated score and the third estimated score.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a data structure of a joint position DB according to the first embodiment.
FIG. 6 is a diagram illustrating an example of a data structure of an element determination table according to the first embodiment.
FIG. 8 is a diagram illustrating an example of a data structure of an element recognition DB according to the first embodiment.
FIG. 9 is a diagram illustrating an example of a display screen before start of performance.
FIG. 11 is a diagram illustrating an example of a display screen after a performance is finished.
FIG. 14 is a diagram illustrating an example of a data structure of a performance history table according to the first embodiment.
FIG. 15 is a diagram illustrating an example of performance routine information.
FIG. 16 is a diagram illustrating an example of a data structure of a score table according to the first embodiment.
FIG. 19 is a diagram (1) for explaining an example of processing of a screen generating unit according to the first embodiment.

FIG. 23 is a diagram illustrating an example of a system according to a second embodiment.

FIG. 24 is a diagram illustrating an example of a display screen displayed by the information processing apparatus according to the second embodiment.

DESCRIPTION OF EMBODIMENTS

Hereinafter, embodiments of a screen generating program, a screen generating method, and an information processing apparatus disclosed in the present application will be described in detail with reference to the drawings. Note that these embodiments are not intended to limit the present invention.

First Embodiment

Figure 1:
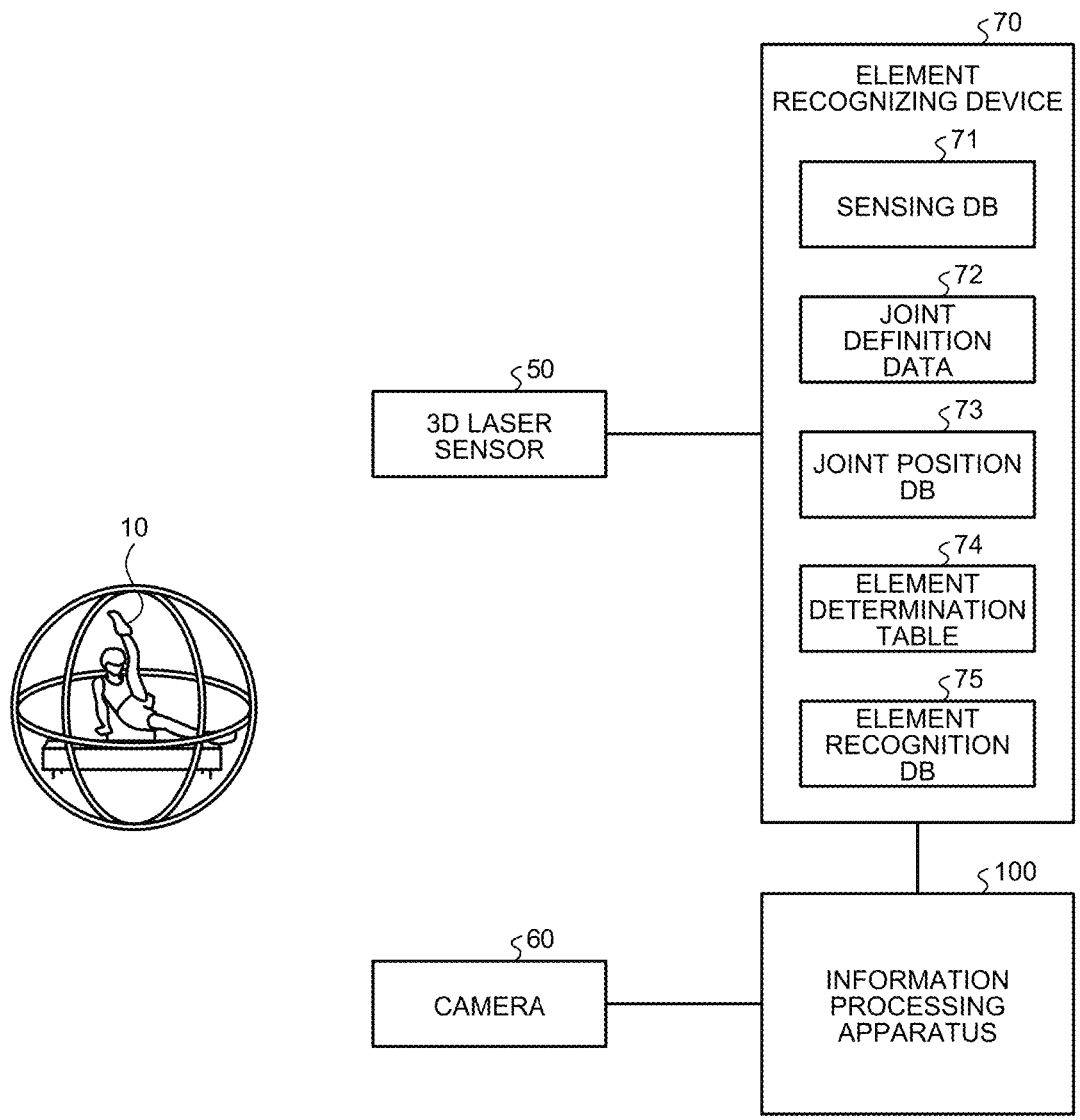
FIG. 1 is a diagram illustrating an example of a system according to a first embodiment.

FIG. 1 is a diagram illustrating an example of a system according to a first embodiment. As illustrated in FIG. 1, this system includes a 3D (3 dimension) laser sensor 50, a camera 60, an element recognition device 70, and an information processing apparatus 100. The information processing apparatus 100 is connected to the camera 60 and the element recognition device 70. In the first embodiment, a case in which an athlete 10 gives a gymnastic performance in front of the 3D laser sensor 50 and the camera 60 will be explained as an example, but it is also applicable to a case in which the athlete 10 performs in another kind of event scored by judges similarly.

For example, the other kind of event scored by judges includes trampoline, high diving, figure skating, karate kata, ballroom dancing, snowboarding, skateboarding, areal skiing, and surfing. Moreover, it may be also applicable to classical ballet, ski jumping, airs and turns in mogul skiing, form check in baseball or basketball, and the like. Moreover, it may be applied to sports, such as Kendo, judo, wrestling, and sumo.

The 3D laser sensor 50 is a sensor that performs 3D sensing with respect to the athlete 10. The 3D laser sensor 50 outputs 3D sensing data obtained as a resultant of sensing, to the element recognition device 70. In the following explanation, the 3D sensing data is denoted simply as sensing data.

Figure 2:
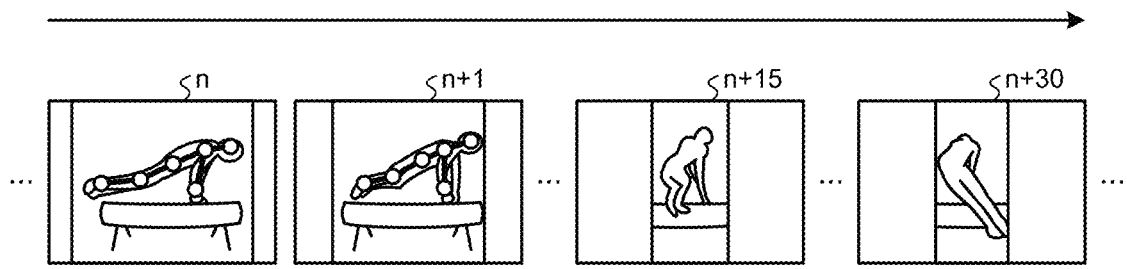
FIG. 2 is a diagram for explaining sensing data.

FIG. 2 is a diagram for explaining the sensing data. The sensing data includes plural frames, and each frame has a frame number assigned thereto to uniquely identify the frame in ascending order. The sensing data in FIG. 2 illustrates frames of frame numbers n, n+1, . . . , n+15, . . . , n+30 sequentially in order of occurrence. n corresponds to a positive integer. For example, each frame includes distance information from the 3D laser sensor 50 to each point on the athlete 10.

The camera 60 is a device that images video data of the athlete 10. The camera 60 outputs the video data to the information processing apparatus 100. The video data includes plural frames corresponding to images of the athlete 10, and a frame number is assigned to each frame. The frame number of the video frame and the frame number of the sensing data are synchronized. Moreover, in the following explanation, a frame included in the sensing data is denoted as "sensing frame", and a frame included in the video data is denoted as "video frame" as appropriate.

The element recognition device 70 is a device that recognizes an element based on the sensing data sensed by the 3D laser sensor 50. The element recognition device 70 generates recognition result data in which each frame number of the sensing data and each recognition result are associated with each other. The element recognition device 70 outputs the recognition result data to the information processing apparatus 100. As an example herein, a case in which the element recognition device 70 is positioned externally to the information processing apparatus 100 is described, but the information processing apparatus 100 may include a functional unit that performs processing similar to that of the element recognition device 70.

Figures 3, 4:
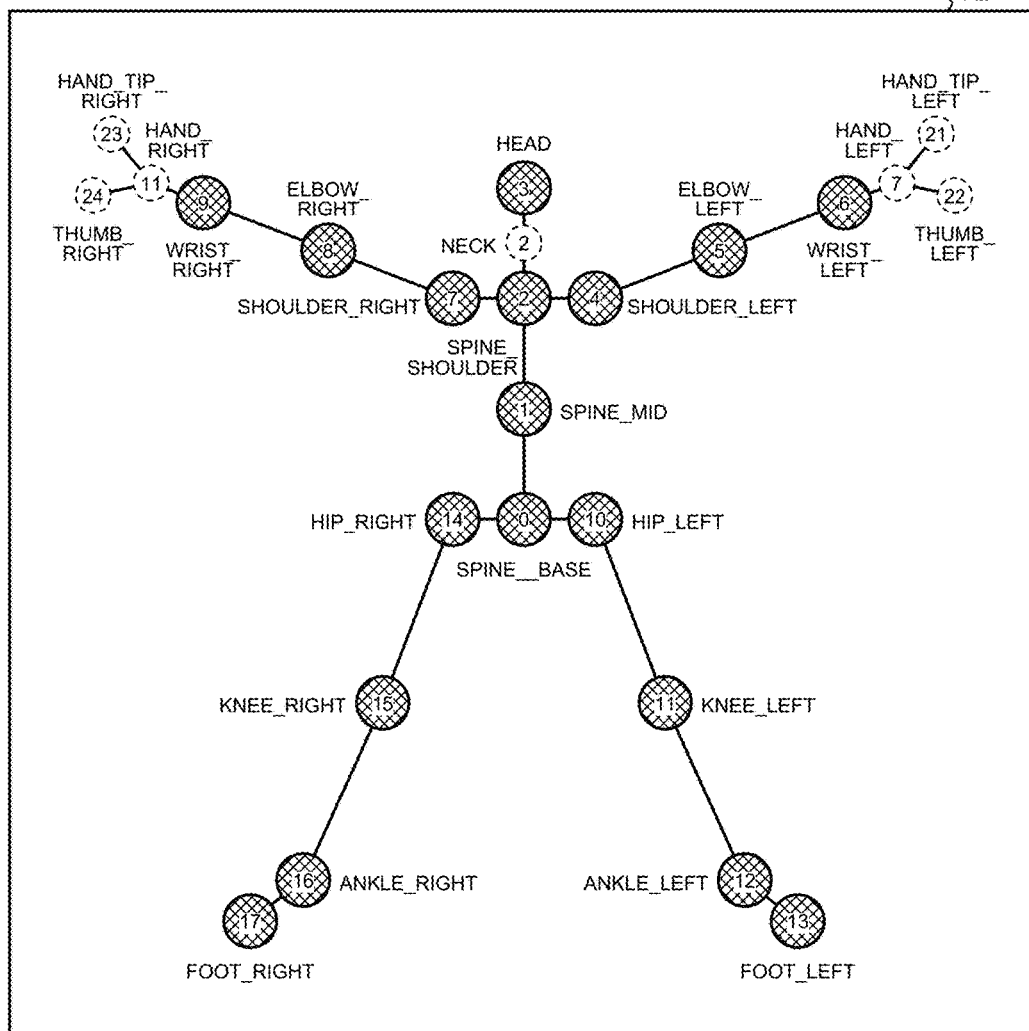
FIG. 3 is a diagram illustrating an example of a data structure of a sensing DB according to the first embodiment.
FIG. 4 is a diagram illustrating an example of joint definition data according to the first embodiment.

For example, the element recognition device 70 includes a sensing DB 71, a joint definition data 72, a joint position DB 73, an element determination table 74, and an element recognition DB 75. The sensing DB (data base) 71 is a DB that stores sensing data acquired from the 3D laser sensor 50. FIG. 3 is a diagram illustrating an example of a data structure of the sensing DB according to the first embodiment. As illustrated in FIG. 3, this sensing DB 71 associates the frame numbers with the sensing frames. The frame number is a number to uniquely identify respective sensing frames corresponding to an identical performance recognition number. The sensing frame is a sensing frame that is sensed by the 3D laser sensor 50.

The joint definition data 72 is data that defines each joint position of the athlete 10. FIG. 4 is a diagram illustrating an example of the joint definition data according to the first embodiment. As illustrated in FIG. 4, the joint definition data 72 stores information in which respective joints that are identified by a publicly known skeleton model are numbered. For example, as illustrated in FIG. 4, 7 is assigned to a right shoulder joint (SHOULDER_RIGHT), 5 is assigned to a left elbow joint (ELBOW_LEFT), 11 is assigned to a left knee joint (KNEE_LEFT), and 14 is assigned to a right hip joint (HIP_RIGHT). In the first embodiment, there is a case in which an X coordinate of the right shoulder joint of 8 is expressed as X8, a Y coordinate thereof is expressed as Y8, and a Z coordinate thereof is expressed as Z8. Note that numbers in dotted line indicate joints and the like that are not used for judgment even if identified from the skeleton model.

The joint position DB 73 is position data of respective joints of the athlete 10 that is generated based on the sensing data of the 3D laser sensor 50. FIG. 5 is a diagram illustrating an example of a data structure of the joint position DB according to the first embodiment. As illustrated in FIG. 5, this joint position DB 73 associates a frame number and "X0, Y0, Z0, . . . , X17, Y17, Z17" with each other.

In FIG. 5, the frame number is a number to uniquely identify a sensing frame. The frame number in FIG. 5 and the frame number in FIG. 3 are synchronized. "X0, Y0, Z0, . . . , X17, Y17, Z17" are XYZ coordinates of the respective joints and, for example, "X0, Y0, Z0" are three-dimensional coordinates of a joint of 0 in FIG. 4.

FIG. 5 illustrates chronological changes of the respective joints, and it is indicated that the positions of the respective joints are "X0=100, Y0=20, Z0=0, . . . , X17=200, Y17=40, Z17=5" in a frame number "1". Furthermore, it is indicated that the positions of the respective joints have been shifted to "X0=101, Y0=25, Z0=5, . . . , X17=202, Y17=39, Z17=15" in a frame number "2".

The element determination table 74 is a table that is used when determining an element performed by the athlete 10. FIG. 6 is a diagram illustrating an example of a data structure of the element determination table according to the first embodiment. As illustrated in FIG. 6, this element determination table associates an element group, an element number, an element name, a start position, a requirement for a start position, a finish position, and a requirement for a finish position with one another.

By a combination of the element group and the element number, an element (element name) is uniquely identified. A combination of an element group and an element number is to be identification information of an element. The element name is a name of an element.

The start position is to indicate a start position of an element. A requirement for a start position indicates a requirement for a concerned start position to be regarded as successful. For example, the requirement for a start position indicates transitions of respective joint positions to form the start position. For example, the finish position indicates a position to finish an element (hold position). For example, the requirement for a finish position indicates a relationship among positions of the respective joints to form the finish position.

Figure 7:
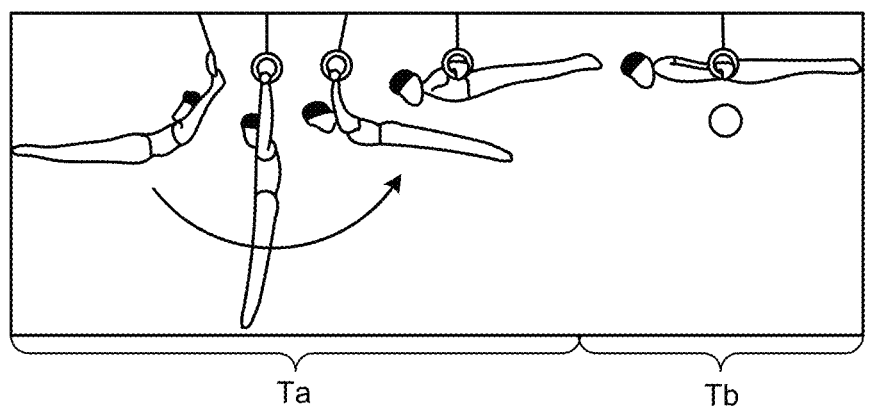
FIG. 7 is a diagram for explaining an example of a start position and a finish position.

FIG. 7 is a diagram for explaining an example of a start position and a finish position. FIG. 7 illustrates an example in which the athlete 10 performs an element, "back uprise maltese (2 seconds)" as one example. The athlete 10 takes a start position "back uprise" in a period Ta, and takes a finish position, "maltese (2 seconds)" in a period Tb. By combining this start position, "back uprise" and the finish position, "maltese", the element, "back uprise maltese (2 seconds)" is composed. As above, when a start position and a finish position are determined, an element is determined.

The element recognition DB 75 is a DB that stores element recognition result data. FIG. 8 is a diagram illustrating an example of a data structure of the element recognition DB according to the first embodiment. As illustrated in FIG. 8, this element recognition DB 75 associates the frame number, the joint position data, a start position flag, a finish position flag, the element group, the element number, and the element name with one another.

The frame number is a number that corresponds to the frame number of a sensing frame explained in FIG. 3. The joint position data is information that indicates three-dimensional coordinates of the respective joint positions corresponding to the respective frame numbers explained in FIG. 5 and the like. The start position flag is information indicating whether a position of the athlete 10 is a start position. When the start position flag is "1", it indicates that the position of the athlete 10 is a start position. The finish position flag is information indicating whether a position of the athlete 10 is a finish position. When the finish position flag is "1", it indicates that the position of the athlete 10 is a finish position. A set of the element group and the element number is information to uniquely identify an element. The element name indicates a name of an element.

Returning back to explanation of FIG. 1, processing performed by the element recognition device 70 using the sensing DB 71, the joint definition data 72, the joint position DB 73, the element determination table 74, and the element recognition DB 75 will be explained.

The element recognition device 70 compares a sensing frame of the sensing DB 71 and positional relationship of respective joints defined by the joint definition data 72, to identify types of respective joints included in the sensing frame and three-dimensional coordinates of the joints. The element recognition device 70 repeats the above processing for respective frame numbers of sensing DB 71, and stores information of the three-dimensional coordinates of the respective joints in the joint position DB 73.

The element recognition device 70 compares the information of the three-dimensional coordinates of the respective joints with the element determination table 74 for each frame number, to identify a start position and a finish position. Moreover, the element recognition device 70 compares a combination of the identified start position and finish position with the element determination table 74, to identify an element group, an element number, and an element name corresponding to the frame number.

The element recognition device 70 stores information in which the frame number, the joint position data, the start position flag, the finish position flag, the element group, the element number, and the element name are associated with one another in the element recognition DB 75. Furthermore, the element recognition device 70 outputs respective records stored in the element recognition DB 75 to the information processing apparatus 100 as recognition result data. For example, the element recognition device 70 performs the processing explained above in real time with respect to sensing data acquired from the 3D laser sensor 50, and outputs the recognition result data to the information processing apparatus 100.

The information processing apparatus 100 is an apparatus that displays an estimated score that is calculated from a series of planned performance of the athlete 10 based on a history of routine that have been performed by the athlete in past. Furthermore, when the performance of the athlete 10 is changed while the actual performance of the athlete 10 proceeds, the information processing apparatus 100 updates the estimated performance thereafter, and updates the estimated score according to a performance update.

One example of a screen displayed by the information processing apparatus 100 will be explained herein. FIG. 9 is a diagram illustrating an example of a display screen before start of performance. In the example illustrated in FIG. 9, a video region 10*a*, an estimated performance list 10*b*, a D score region 10*c*, an E score region 10*d*, a score region 10*e*, and a place estimation region 10*f* are included in a display screen 10A.

The video region 10*a* is a region in which video data of the athlete 10 is displayed. For example, the information processing apparatus 100 displays video data of a preliminary performance performed by the athlete 10 in past in the video region 10*a*.

The estimated performance list 10*b* is to display information of a series of elements (performance) estimated to be performed by the athlete 10. For example, the estimated performance list 10*b* associates an element name, an element group, an element number, and a difficulty with one another. Explanation of the element name, the element group, the element number is the same as the explanation above. The difficulty is to indicate a degree of difficulty of an element. There are difficulties of "A to H" for men, and difficulties of "A to I" for women.

The estimated performance list 10b indicates that respective elements are sequentially performed from an element (element name) on a first row toward a lower row. In the example illustrated in FIG. 9, back uprise maltese (2 seconds), back uprise swallow (2 seconds), Azarian, back uprise to handstand (2 seconds), Jonasson, Yamawaki, and Honma to cross are performed sequentially. Moreover, it is indicated that felge to handstand (2 seconds), straight arm felge through handstand, backward double double tucked dismount are performed sequentially.

The D score region 10c is a region in which a D score when the athlete 10 performs elements on the estimated performance list 10b as planned is displayed. The D (difficulty) score is a score calculated according to the difficulties of elements composing the performance.

The E score region 10d is a region in which an E score that is calculated based on records of performance of the athlete 10 of the elements on the estimated performance list 10b performed in past. The E (execution) score is a score relating to a quality of performance and positions of the body in each element of an element calculated by a demerit system. For example, an ideal position of one element is compared with a position of the athlete 10, and as a degree of separation in each position increases, more points are deducted from the E score.

The score region 10e is a region in which an estimated score when the athlete 10 performs the elements on the estimated performance list 10b as planned is displayed. Specifically, the information processing apparatus 100 displays a score acquired by totalizing the D score displayed in the D score region 10c and the E score displayed in the E score region 10d, in the score region 10e.

The place estimation region 10f is a region in which information of estimated places regarding multiple athletes is displayed. For example, the place estimation region 10f associates a place, an athlete name, and an estimated score with one another.

For example, reference to the display screen 10A before start of performance enables a user (play-by-play announcer of a live broadcast or a viewer) to grasp a sequence of elements performed by the athlete 10, the D score, the E score, the score, and the place easily.

Figure 10:
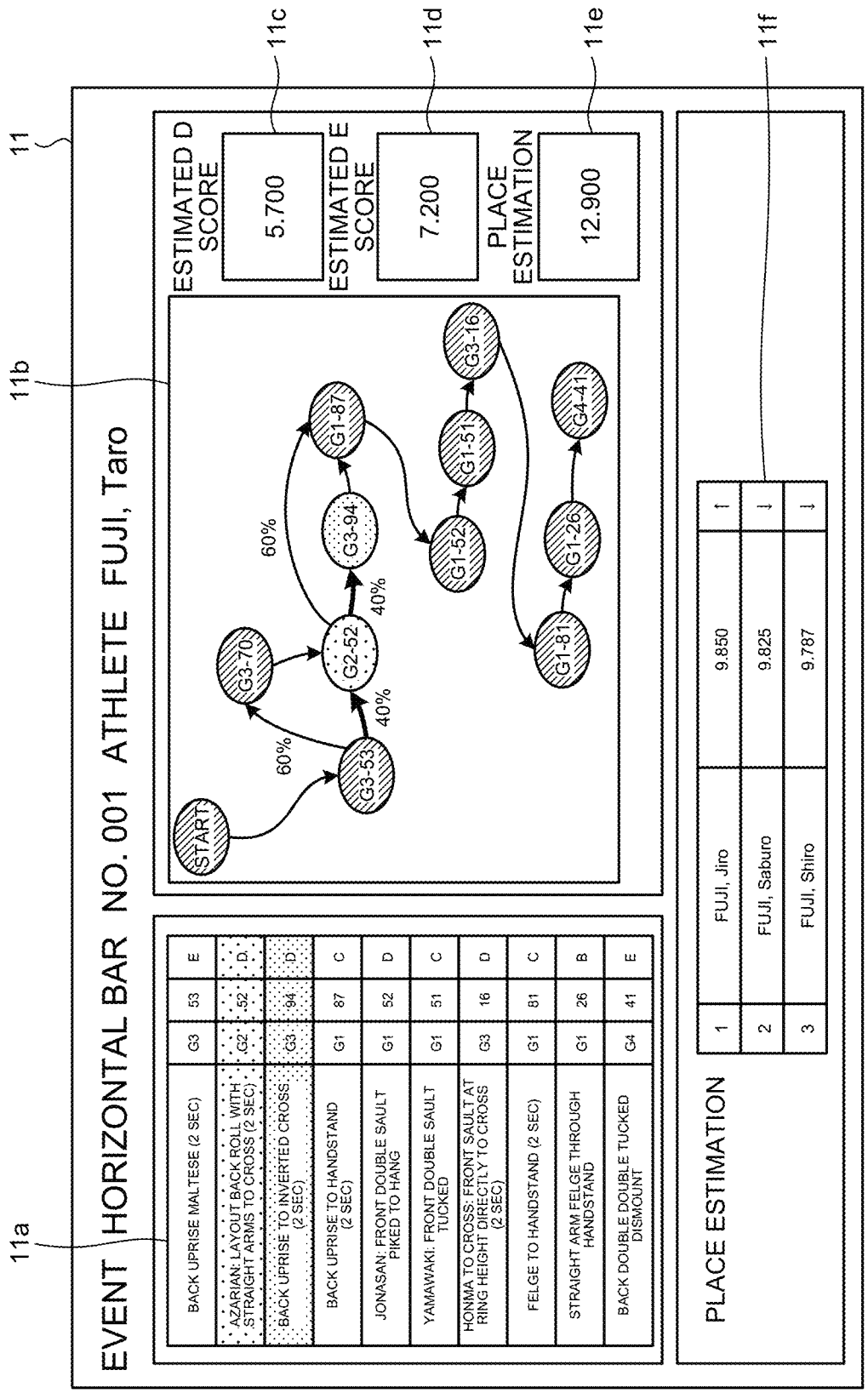
FIG. 10 is a diagram illustrating an example of a display screen during performance.

FIG. 10 is a diagram illustrating an example of a display screen during performance. In the example illustrated in FIG. 10, the display screen 11 includes a performance list 11a, performance transition information 11b, a D score region 11c, an E score region 11d, a score region 11e, and a place estimation region 11f.

The performance list 11a is to display information of elements that have been actually performed by the athlete 10 during the performance and elements estimated to be performed by the athlete 10 hereafter. The performance list 11a associates the element name, the element group, a branch number, and the difficulty with one another. For example, the information processing apparatus 100 may highlight an element name of an element that is currently being performed by the athlete 10, and an element name of an element to be performed next. In the example illustrated in FIG. 10, in the performance list 11a, an element name "Azarian" of the element currently being performed by the athlete 10 and "back uprise to inverted cross (2 seconds)" estimated to be performed next are highlighted.

The performance transition information 11b is information indicating a transition of elements that have been performed by the athlete 10, and a transition of elements that are estimated to be performed by the athlete 10 hereafter. In the performance transition information 11b, a node indicating start and multiple nodes indicating elements are connected. For example, to a node indicating an element, a set of an element group and an element number is assigned. Moreover, when more than one candidate is present when transitioning from one element to a next element, a probability of transition to a transition destination is displayed together therewith.

As illustrated in the performance transition information 11b in FIG. 10, it is indicated that it transitions from the node of start to a node "G3-53". The transition destination of the node "G3-53" is a node "G3-70" and a node "G2-52". A probability of transition from the node "G3-53" to the node "G3-70" is "60%". On the other hand, a probability of transition from the node "G3-53" to the node "G2-52" is "40%". Moreover, the transition destination of the node "G3-70" is the node "G2-52".

The transition destination of the node "G2-52" is a node "G3-94" and a node "G1-87". A probability of transition from the node "G2-52" to the node "G1-87" is "60%". On the other hand, a probability of transition from the node "G2-52" to the node "G3-94" is "40%". Moreover, the transition destination of the node "G3-94" is the node "G1-87".

Transition destinations of nodes following the node "G1-87" are, sequentially, nodes "G1-52", "G1-51", "G3-16", "G1-81", "G1-26", and "G4-41".

The information processing apparatus 100 highlights a node corresponding to the element currently being performed and a node to be transitioned to next. The information processing apparatus 100 highlights a node having higher probability of transition when more than one node to be transitioned to is present.

The D score region 11c is a region in which the D score estimated when an element that has actually been performed by the athlete 10 since a start of performance and elements to be performed subsequently are performed as planned are displayed. For example, suppose that the athlete 10 has actually performed up to Azarian in the performance list 11a illustrated in FIG. 10. In this case, the D score is calculated based on the elements that have actually been performed and the elements estimated to be subsequently performed, and the D score is displayed in the D score region 11c. The elements actually been performed are back uprise maltese (2 seconds) and Azarian. The elements estimated subsequently are back uprise to handstand (2 seconds), Jonasson, Yamawaki, and Honma to cross, felge to handstand (2 seconds), straight arm felge through handstand, backward double double tucked dismount.

The E score region 11d is a region in which the E score estimated when an element that has been actually performed by the athlete 10 since start of performance and the elements to be performed subsequently are performed as planned is displayed. For example, suppose that athlete 10 has performed up to Azarian in the performance list 11a illustrated in FIG. 10. In this case, the E score is calculated based on the elements actually been performed and the elements estimated to be performed subsequently, and the relevant E score is displayed in the E score region 11d. The elements actually been performed are back uprise maltese (2 seconds) and Azarian. The elements estimated subsequently are back uprise to handstand (2 seconds), Jonasson, Yamawaki, and Honma to cross, felge to handstand (2 seconds), straight arm felge through handstand, backward double double tucked dismount.

The score region 11e is a region in which the score estimated when an element that has actually been performed by the athlete 10 since start of performance and elements estimated to be performed subsequently are performed as planned is displayed. Specifically, the information processing apparatus 100 displays the score acquired by totalizing the D score displayed in the D score region 11c and the E score displayed in the E score region 11d, in the score region 11e.

The place estimation region 11f is a region in which information of estimated places of multiple athletes is displayed. For example, the place estimation region 11f associates a place, an athlete name, an estimated score, and a state of change in place with one another. The information processing apparatus 100 displays a mark indicating up in place change information when a place moves up with an update of the score region 11e as the performance of the athlete 10 proceeds. The information processing apparatus 100 displays a mark indicating down in the place change information when the place moves down.

For example, when a play-by-play announcer of a live broadcast refers to the display screen 11 illustrated in FIG. 10, he/she can grasp a change of elements with a single glance. Therefore, it is possible to support a live broadcasting of the announcer. For example, in FIG. 10, when the transition destination of the node "G3-53" is changed from the node "G2-52" to the node "G3-70", it is possible to make a live announcement, "the planned element G3-53 is changed to an element G3-70 to reverse and move up" or the like. Furthermore, when a viewer refers to the display screen 11 illustrated in FIG. 10, because understanding of an element currently being performed can be facilitated, it is possible to view the performance of the athlete 10 with excitement.

FIG. 11 is a diagram illustrating an example of the display screen after a performance is finished. In the example illustrated in FIG. 11, a video region 12a, a performance list 12b, a D score region 12c, an E score region 12d, a score region 12e, and a place estimation region 12f are included in a display screen 12.

The video region 12a is a region in which video data of the athlete 10 is displayed. For example, the information processing apparatus 100 displays video data of the athlete 10 imaged by the camera 60 in the video region 12a.

The performance list 12b is to display information of a series of elements (performance) actually performed by the athlete 10. The performance list 12b associates an element name, an element group, a branch number, and a difficulty with one another. The performance list 12b indicates that respective elements have been performed sequentially from an element (element name) on a first row toward a lower row.

The D score region 12c is a region in which a D score based on the respective elements actually performed by the athlete 10 is displayed. The E score region 12d is a region in which an E score based on the respective elements actually performed by the athlete 10 is displayed. The score region 12e is a region in which a score based on the respective elements actually performed by the athlete 10 is displayed.

The place estimation region 12f is a region in which information of places regarding multiple athletes (for example, provisional places at the time when performance of the athlete 10 is finished) is displayed. For example, the place estimation region 12f associates a place, an athlete name, and a score with one another.

For example, reference to the display screen 12 illustrated in FIG. 11 enables a user (play-by-play announcer of a live broadcast or a viewer) to grasp the result to some extent in advance without waiting for the official announcement.

Figures 12, 13:
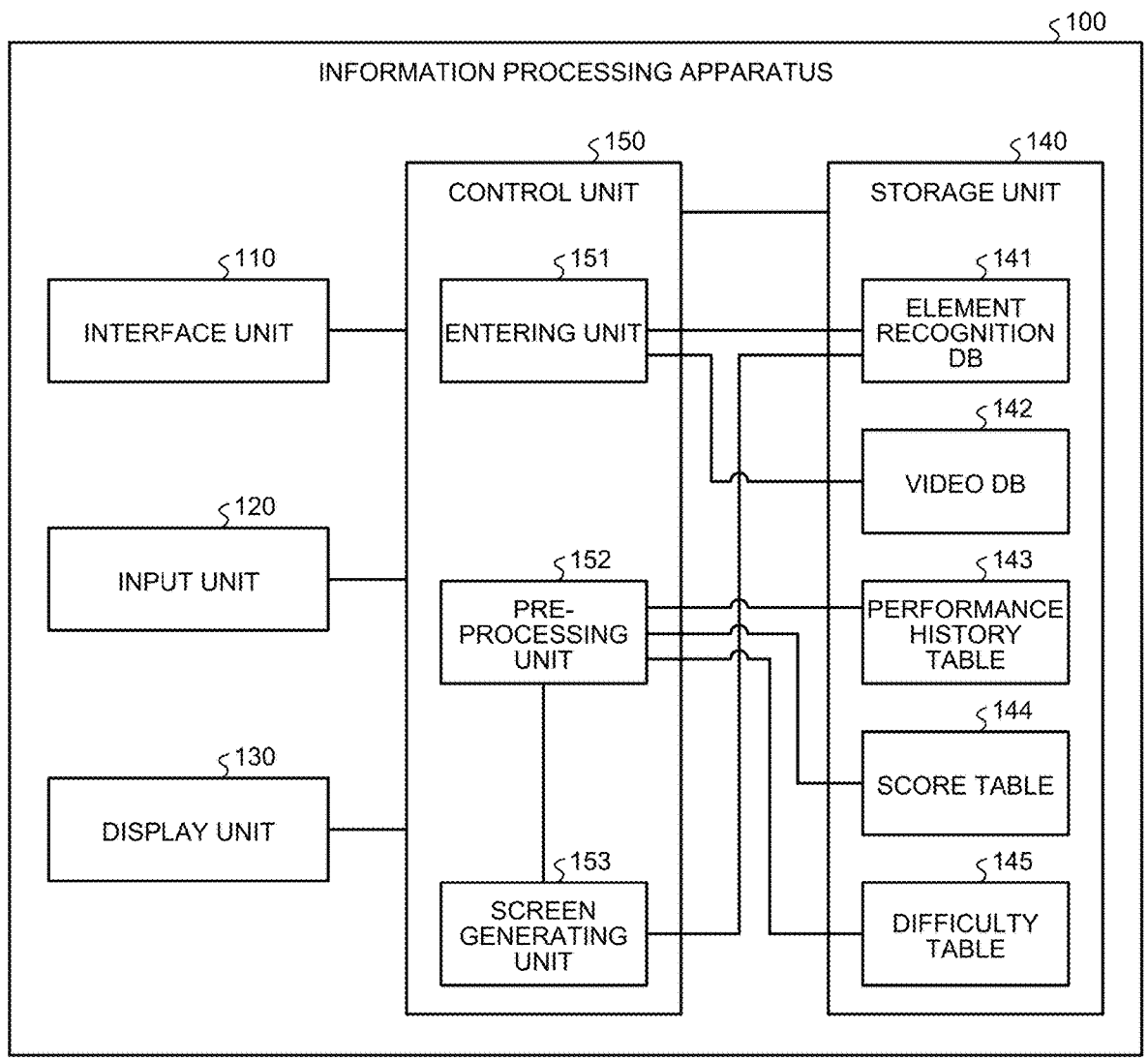
FIG. 12 is a functional block diagram illustrating a configuration of an information processing apparatus according to the first embodiment.
FIG. 13 is a diagram illustrating an example of a data structure of a video DB according to the first embodiment.

Subsequently, a configuration of the information processing apparatus 100 according to the first embodiment will be explained. FIG. 12 is a functional block diagram illustrating a configuration of the information processing apparatus according to the first embodiment. As illustrated in FIG. 12, this information processing apparatus includes an interface unit 110, an input unit 120, a display unit 130, a storage unit 140, and a control unit 150.

The interface unit 110 is a device that is connected to the camera 60 and the element recognition device 70, and that acquires data from the camera 60 and the element recognition device 70. The interface unit 110 outputs the acquired data to the control unit 150. For example, the interface unit 110 acquires video data from the camera 60. The interface unit 110 acquires recognition result data from the element recognition device 70.

The input unit 120 is an input device to input various kinds of information to the information processing apparatus 100. The input unit 120 corresponds to a keyboard, a mouse, a touch panel, and the like.

The display unit 130 is a display device that displays information for a display screen output from the control unit 150. The display unit 130 corresponds to a liquid crystal display, a touch panel, and the like. For example, the display unit 130 displays the display screens illustrated in FIG. 9 to FIG. 10.

The storage unit 140 includes an element recognition DB 141, a video DB 142, a performance history table 143, a score table 144, and a difficulty table 145. The storage unit 140 corresponds to a semiconductor memory device, such as a RAM (random access memory), a ROM (read only memory), and a flash memory, or a storage device, such as an HDD (hard disk drive).

The element recognition DB 141 is a table that holds the recognition result data of the element recognition device 70. A data structure of the element recognition DB 141 corresponds to the data structure of the element recognition DB 75 explained in FIG. 8. For example, the element recognition DB 141 associates a frame number, joint position data, a start position flag, a finish position flag, an element group, an element number, and an element name with one another.

The video DB 142 is a database that stores video data acquired from the camera 60. FIG. 13 is a diagram illustrating an example of the data structure of the video DB according to the first embodiment. As illustrated in FIG. 13, this video DB 142 associates a frame number and a video frame with each other. Although illustration is omitted, the video DB 142 may hold video data of performances that have been performed in past by respective athletes, associating with an athlete ID.

In FIG. 13, the frame number is a number to uniquely identify each video frame. Note that the frame number of the video frame is synchronized with the frame number of the sensing frame. The video frame is a video frame imaged by the camera 60.

The performance history table 143 is a table that holds information regarding a history of performance that has been performed in past by the athlete 10 or other athletes. FIG. 14 is a diagram illustrating an example of a data structure of the performance history table according to the first embodiment. As illustrated in FIG. 14, this performance history table 143 associates the athlete ID, a date, a competition ID, performance routine information, scores, and performance time with one another.

The athlete ID is information to uniquely identify an athlete. The date is to indicate a date of performance by an athlete. The competition ID is information to uniquely identify a competition. The performance routine information is information that indicates a performance routine performed by an athlete in the relevant competition. The score indicates a score of an athlete in the relevant competition. For example, the score includes the D score, the E score, and the score (the total score of the D score and the E score). The performance time indicates time of performance performed by an athlete.

Moreover, although illustration is omitted, the performance history table 143 further holds a history of the E score corresponding to each group and element number per athlete ID, to support processing of calculating the E score described later.

FIG. 15 is a diagram illustrating an example of performance routine information. In FIG. 15, performance routine information of an athlete ID "U1001" in the competition ID "A101", which is listed on the first row in FIG. 14 is illustrated as an example. As illustrated in FIG. 15, the performance routine information associates order, an element name, an element group, an element number, and a difficulty with one another. The order is to indicate order in which the athlete performs an element of the relevant element name. Explanation of the element name, the element group, the element number, and the difficulty is the same as the explanation above.

The score table 144 is a table that holds information regarding scores of respective athletes. FIG. 16 is a diagram illustrating an example of a data structure of the score table according to the first embodiment. As illustrated in FIG. 16, this score table 144 associates the athlete ID, the estimated score, and the score with one another. In FIG. 16, the athlete ID is information to uniquely identify an athlete. The estimated score is an estimated score of an athlete. The estimated score includes the D score, the E score, and the score (the total score of the D score and the E score).

Figures 17, 18:
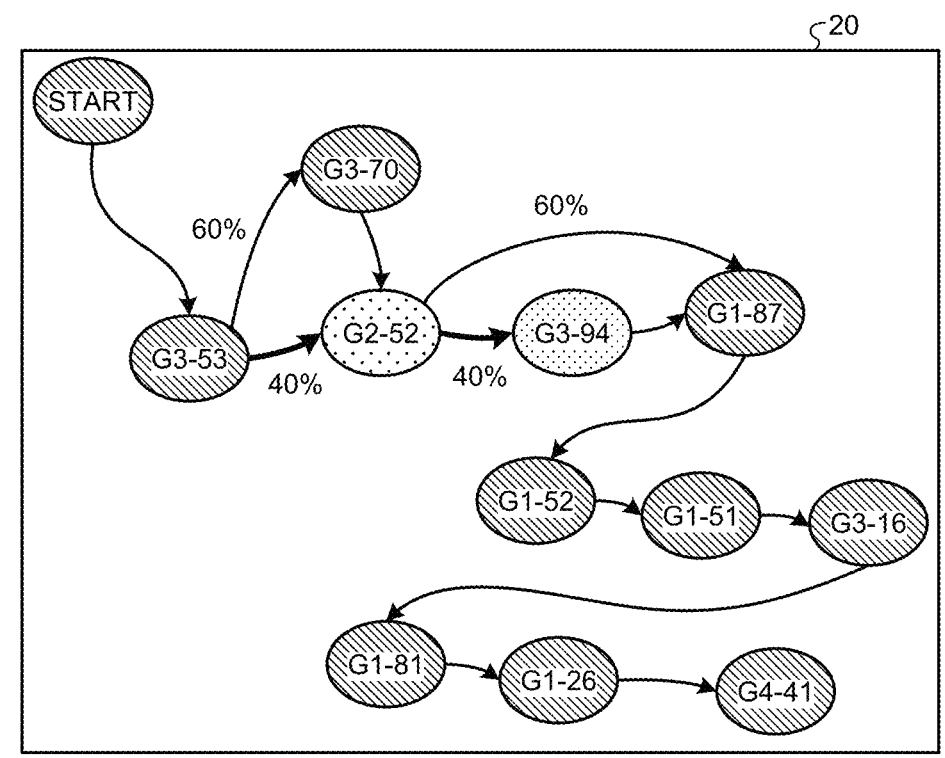
FIG. 17 is a diagram illustrating an example of a data structure of a difficulty table according to the first embodiment.
FIG. 18 is a diagram illustrating an example of performance-transition flow information.

The difficulty table 145 is a table in which the difficulty used when calculating the D score, and the score are associated with each other. FIG. 17 is a diagram illustrating an example of a data structure of the difficulty table according to the first embodiment. As illustrated in FIG. 17, this difficulty table 145 associates the element group, the element number, the difficulty, and the score with one another.

The control unit 150 includes an entering unit 151, a preprocessing unit 152, and a screen generating unit 153. The control unit 150 can be implemented by a CPU (central processing unit), an MPU (micro processing unit), or the like. Moreover, the control unit 150 can also be implemented by hard wired logic, such as an ASIC (application specific integrated circuit) and an FPGA (field programmable gate array).

The entering unit 151 is a processing unit that acquires recognition result data from the element recognition device 70 when a performance of the athlete 10 is started, and that enters the acquired recognition result data in the element recognition DB 141. Furthermore, the entering unit 151 acquires video data from the camera 60 when a match of the athlete 10 is started, and enters the acquired video data in the video DB 142.

The preprocessing unit 152 acquires "planned performance information" including plural elements planned to be performed by the athlete 10 from the performance history table 143. Moreover, the preprocessing unit 152 calculates an estimated score in the case in which the elements succeed, from the planned performance information, and generates screen information to display the estimated score of the estimated performance. For example, the screen information to display the estimated score of the estimated performance corresponds to the information in the display screen 10A explained in FIG. 9. The estimated score calculated by the preprocessing unit 152 corresponds to a first estimated score.

One example of processing of the preprocessing unit 152 of acquiring the "planned performance information" from the performance history table 143 will be explained. For example, when receiving the athlete ID of an athlete to be a subject from the input unit 120, the preprocessing unit 152 acquires plural pieces of the performance routine information corresponding to the received athlete ID from the performance history table 143. The preprocessing unit 152 compares sets of the order and the element (element name) included in the plural pieces of the performance routine information with one another, and identifies an element having the highest frequency per order, to generate "performance-transition flow information". Moreover, the preprocessing unit 152 calculates a probability of transition to an element of each transition destination when there are plural transition destinations from on element.

FIG. 18 is a diagram illustrating an example of the performance-transition flow information. As illustrated in FIG. 18, in this performance-transition flow information 20, a node indicating start and plural nodes indicating elements are connected. For example, to the node indicating an element, a set of an element group and an element number is assigned. Moreover, when more than one candidate is present when transitioning from one element to a next element, a probability of transition to a transition destination is added.

As illustrated in FIG. 18, it is indicated that it is transitioned from the node of start to a node "G3-53". The transition destination of the node "G3-53" is a node "G3-70" and a node "G2-52". A probability of transition from the node "G3-53" to the node "G3-70" is "60%". On the other hand, a probability of transition from the node "G3-53" to the node "G2-52" is "40%". Moreover, the transition destination of the node "G3-70" is the node "G2-52".

The transition destination of the node "G2-52" is a node "G3-94" and a node "G1-87". A probability of transition from the node "G2-52" to the node "G1-87" is "60%". On the other hand, a probability of transition from the node "G2-52" to the node "G3-94" is "40%". Moreover, the transition destination of the node "G3-94" is the node "G1-87".

Transition destinations of nodes following the node "G1-87" are, sequentially, nodes "G1-52", "G1-51", "G3-16", "G1-81", "G1-26", and "G4-41".

In this example, the case in which the preprocessing unit 152 generates the performance-transition flow information has been explained as an example, but it is not limited thereto. It may be configured such that the performance-transition flow information is generated in advance for each of the athlete ID, and the preprocessing unit 152 acquires that performance-transition flow information.

The preprocessing unit 152 identifies the most probable sequence of elements in which the athlete performs based on the performance-transition flow information. The preprocessing unit 152 follows the nodes of elements from the start node in the performance-transition flow information, and if more than one transition destination of an element is present, transitions to a node with higher probability, and thereby identifies the sequence of elements.

For example, in the performance-transition flow information 20 illustrated in FIG. 18, the sequence of elements in which the athlete performs is, starting from the start node, the nodes "G3-53", "G3-70", "G-2-52", "G1-87", "G1-52", "G1-51", "G3-16", "G1-81", "G1-26", and "G4-41". By the processing described above, the types of elements and the sequence of elements identified by the preprocessing unit 152 is to be the "planned performance information". The preprocessing unit 152 outputs the planned performance information and the performance-transition flow information to the screen generating unit 153.

Subsequently, the processing of calculating the D score of the planned performance information by the preprocessing unit 152 will be explained. The preprocessing unit 152 compares elements included in the planned performance information with the difficulty table 145, to identify a score of each element. The preprocessing unit 152 calculates the D score corresponding to the planned performance information by totalizing the identified scores of respective elements. For example, the D score corresponding to the planned performance information is the score displayed in the D score region 10c in FIG. 9.

The processing of calculating the E score of the planned performance information by the preprocessing unit 152 will be explained. The preprocessing unit 152 compares elements included in the planned performance information, the athlete ID, with the performance history table 143, to identify the E score of each element. The preprocessing unit 152 calculates the E score corresponding to the planned performance information by totalizing the E scores of respective elements. For example, the E score corresponding to the planned performance information is the score displayed in the E score region 10d in FIG. 9.

The processing of calculating the score of the planned performance information by the preprocessing unit 152 will be explained. The preprocessing unit 152 calculates the score of the planned performance information by totalizing the D score and the E score of the planned performance information. For example, the score corresponding to the planned performance information is the score displayed in the score region 10e in FIG. 9.

The preprocessing unit 152 stores the calculated D score, the E score, and the score, associating with the athlete ID, in the score table 144. The D score, the E score, and the score calculated by the preprocessing unit 152 are to be information corresponding to the item of the estimated score in the score table 144.

The screen generating unit 153 generates information of the display screen 10A illustrated in FIG. 9 before start of performance of the athlete 10, and outputs it to the display unit 130 to be displayed. The screen generating unit 153 generates information of the display screen 11 illustrated in FIG. 10 during a performance of the athlete 10, and outputs it to the display unit 130 to be displayed. The screen generating unit 153 generates information of the display screen 12 illustrated in FIG. 11 after the performance of the athlete 10 is finished, to be displayed. For example, the screen generating unit 153 estimates a third estimation score of the entire performance being performed based on scores of elements that have been performed, and a second estimation score in the case in which estimated elements that have not been performed succeed. For example, in FIG. 18, it is assumed that the element routine is as "G3-53", "G3-70", "G2-52", "G1-87", "G1-52", "G1-51", "G3-16", "G1-81", "G1-26", and "G4-41", and that it has been performed up to "G2-52". In this case, the second estimation score is a score of "G1-87", "G1-52", "G1-51", "G3-16", "G1-81", "G1-26", and "G4-41". The third estimation score is to be a score acquired by totalizing scores of "G3-53", "G3-70", "G2-52" that have been performed and the second estimation score. Details are described later.

One example of the processing of generating the display screen 10A "before start of performance" of the athlete 10 by the screen generating unit 153 will be explained. The display screen 10A includes the video region 10a, the estimated performance list 10b, the D score region 10c, the E score region 10d, the score region 10e, and the place estimation region 10f.

When receiving the athlete ID of an athlete to be a subject from the input unit 120, the screen generating unit 153 acquires past video data corresponding to the received athlete ID from the video DB 142, and uses it as information to be displayed in the video region 10a.

The screen generating unit 153 arranges pieces of information of a set of the element name, the element group, the element number, and the difficulty in sequence of estimated element routine based on the planned performance information, and thereby generates the estimated performance list 10b.

The screen generating unit 153 acquires an estimated score corresponding to the athlete ID received from the input unit 120. The screen generating unit 153 uses the D score, the E score, and the score included in the estimated score as information to be displayed in the D score region 10c, the E score region 10d, and the score region 10e.

The screen generating unit 153 acquires the athlete ID of the athlete to be a subject, and athlete IDs of other athletes that participate in this competition. In the following description, the athlete to be a subject is denoted as first athlete, and the other athlete to be compared therewith are denoted as second athlete. The screen generating unit 153 acquires a score of the second athlete by comparing the athlete ID of the second athlete with the score table 144. When a performance of the second athlete is finished and information of the score is stored in the score table 144, the screen generating unit 153 acquires information of the relevant score. On the other hand, when it is before start of the performance of the second athlete and information of the score is not stored in the score table 144, the screen generating unit 153 acquires information of the estimated score.

The screen generating unit 153 compares the score of the first athlete (score before performance) and the scores of the plural second athletes (scores before performance or after performance), to determine places of the athletes. The screen generating unit 153 generates information of the place estimation region 10f by corresponding to the place, the name of the athlete, and the score. For example, the screen generating unit 153 refers to a table (not illustrated) in which the athlete ID and the athlete name are associated with each other, to identify an athlete name corresponding to an athlete ID.

The screen generating unit 153 generates and arranges information corresponding to the video region 10a, the estimated performance list 10b, the D score region 10c, the E score region 10d, the score region 10e, and the place estimation region 10f, and thereby generates information for the display screen 10A.

Subsequently, one example of the processing of generating information of the display screen 11 "during performance" of the athlete 10 by the screen generating unit 153 will be explained. As explained in FIG. 10, the display screen 11 includes the performance list 11a, the performance transition information 11b, the D score region 11c, the E score region 11d, the score region 11e, and the place estimation region 11f. The screen generating unit 153 updates information to be displayed in the performance list 11a, the performance transition information 11b, the D score region 11c, the E score region 11d, the score region 11e, and the place estimation region 11f as the performance of the athlete 10 proceeds.

One example of the processing of updating the information of the performance list 11a will be explained. First, the screen generating unit 153 generates initial information of the performance list 11a according to the sequence of the respective elements indicated in the planned performance information.

When the performance of the athlete 10 is started, an output of the recognition result data by the element recognition device 70 is started, and the recognition result data is stored in the element recognition DB 141. The screen generating unit 153 refers to the element recognition DB 141, and acquires elements that have actually been performed by the athlete 10 sequentially, and compares the elements actually performed and the performance-transition flow information.

The screen generating unit 153 keeps the performance list 11a to have the initial information when the element performed by the athlete 10 has transitioned to a transition destination with a higher probability. Moreover, the screen generating unit 153 may highlight a portion corresponding to an element name of an element currently being performed by the athlete 10, in the performance list 11a. For example, when the athlete 10 is currently performing the element of the element name "Azarian", an item of "Azarian" included in the performance list 11a is highlighted.

On the other hand, screen generating unit 153 updates the information of the performance list 11a when the element performed by the athlete 10 has transitioned to a transition destination with a lower probability, based on the performance-transition flow information. For example, when an element performed by the athlete 10 subsequent to the element corresponding to the node "G3-53" is the element corresponding to the node "G2-52", it has transitioned to one with a lower probability, and the screen generating unit 153 updates the information of the performance list 11a. When an element performed by the athlete 10 subsequent to the element corresponding to the node "G2-52" is the element corresponding to the node "G3-94", it has transitioned to one with a lower probability, and the screen generating unit 153 updates the information of the performance list 11a.

Suppose that the sequence of elements in the performance list 11a before update is "G3-53", "G3-70", "G2-52", "G1-87", "G1-52", "G1-51", "G3-16", "G1-81", "G1-26", and "G4-41". On the other hand, the sequence of elements in the performance list 11a after update is "G3-53", "G2-52", "G3-94", "G1-87", "G1-52", "G1-51", "G3-16", "G1-81", "G1-26", and "G4-41".

For example, the screen generating unit 153 updates the information of the performance list 11a as illustrated in FIG. 19. FIG. 19 is a diagram (1) for explaining an example of processing of a screen generating unit according to the first embodiment. In FIG. 19, a performance list 11a-1 is a performance list before update. A performance list 11a-2 is a performance list after update. As illustrated in FIG. 19, the second element "back uprise swallow (2 seconds)<G3-70>" in the performance list 11a-1 is deleted from the performance list 11a-2. Moreover, at the third of the performance list 11a-2, the element "back uprise to Inverted cross (2 seconds)<G3-94>" that is included in the performance list 11a-1 is added.

One example of the processing of updating the performance transition information 11b by the screen generating unit 153 will be explained. First, the screen generating unit 153 arranges the start node and the nodes of elements corresponding to the performance-transition flow information 20, and thereby generates the performance transition information 11b.

When a performance of the athlete 10 is started, the screen generating unit 153 refers to the element recognition DB 141, to acquire elements that have actually been performed by the athlete 10 sequentially, and highlights a node of an element corresponding to the acquired element.

One example of the processing of updating the D score region 11c by the screen generating unit 153 will be explained. First, the screen generating unit 153 compares the athlete Id of the athlete 10 with the score table 144, to acquire the estimated D score of the athlete 10 from the item of the estimated score. The screen generating unit 153 enters the acquired D score in the D score region 11c.

When a performance of the athlete 10 is started, the screen generating unit 153 refers to the element recognition DB 141, to acquire elements that have actually been performed by the athlete 10 sequentially, and compares the elements actually performed with the performance-transition flow information.

The screen generating unit 153 keeps the D score to be displayed in the D score region 11c as it is when the element performed by the athlete 10 has transitioned to a transition destination with a higher probability.

On the other hand, the screen generating unit 153 updates elements performed by the athlete 10 based on the performance-transition flow information when the element performed by the athlete 10 has transitioned to a transition destination with a lower probability. It will be explained using the performance-transition flow information 20 illustrated in FIG. 18 as an example. For example, when the element performed by the athlete 10 after the element corresponding to the node "G3-53" is the element corresponding to the node "G3-52", it has transitioned to one with a lower probability, and the screen generating unit 153 updates the elements performed by the athlete 10.

The elements to be performed by the athlete 10 before update are "G3-53", "G3-70", "G2-52", "G1-87", "G1-52", "G1-51", "G3-16", "G1-81", "G1-26", and "G4-41". On the other hand, the elements performed by the athlete 10 after update are "G3-53", "G2-52", "G3-94", "G1-87", "G1-52", "G1-51", "G3-16", "G1-81", "G1-26", and "G4-41".

The screen generating unit 153 compares the elements after update with the difficulty table 145, to identify a score of each element. The screen generating unit 153 newly calculates the D score corresponding to the elements after update by totalizing the identified scores of the respective elements. The screen generating unit 153 displays the calculated D score in the D score region 11c. Moreover, the screen generating unit 153 may highlight the D score in the D score region 11c when the newly calculated D score is to be displayed. Furthermore, the screen generating unit 153 updates the D score in the score table 144 (D score of the estimated score) with the calculated D score.

One example of the processing of updating the E score region 11d by the screen generating unit 153 will be explained. First, the screen generating unit 153 compares the athlete ID of the athlete 10 with the score table 144, to acquire the estimated E score of the athlete 10 from the item of the estimated score. The screen generating unit 153 enters the acquired E score in the E score region 11d.

When a performance of the athlete 10 is started, the screen generating unit 153 refers to the element recognition DB 141, to acquire elements that have actually been performed by the athlete 10 sequentially, and compares the elements actually performed with the performance-transition flow information.

The screen generating unit 153 keeps the E score to be displayed in the E score region 11d as it is when the element performed by the athlete 10 has transitioned to a transition destination with a higher probability.

On the other hand, the screen generating unit 153 updates elements performed by the athlete 10 based on the performance-transition flow information when the element performed by the athlete 10 has transitioned to a transition destination with a lower probability. It will be explained using the performance-transition flow information 20 illustrated in FIG. 18 as an example. For example, when the element performed by the athlete 10 after the element corresponding to the node "G3-53" is the element corresponding to the node "G3-70", it has transitioned to one with a lower probability, and the screen generating unit 153 updates the elements performed by the athlete 10. The elements before update and elements after update are the same as those in the processing of updating the D score region 11c.

The screen generating unit 153 compares the elements after update with the performance history table 143, to identify an E score of each element. The screen generating unit 153 newly calculates the E score corresponding to the elements after update by totalizing the identified E scores of the respective elements. The screen generating unit 153 enters the calculated E score in the E score region 11d. Moreover, the screen generating unit 153 may highlight the E score in the E score region 11d when the newly calculated E score is to be displayed. Furthermore, the screen generating unit 153 updates the E score in the score table 144 (E score of the estimated score) with the calculated D score.

One example of the processing of updating the score region 11e by the screen generating unit 153 will be explained. First, the screen generating unit 153 compares the athlete ID of the athlete 10 with the score table 144, to acquire the estimated score of the athlete 10 from the item of the estimated score. The screen generating unit 153 enters the acquired score in the score region 11e.

When a performance of the athlete 10 is started, the screen generating unit 153 refers to the element recognition DB 141, to acquire elements that have actually been performed by the athlete 10 sequentially, and compares the elements actually performed with the performance-transition flow information.

The screen generating unit 153 keeps the score to be displayed in the score region 11e as it is when the element performed by the athlete 10 has transitioned to a transition destination with a higher probability.

On the other hand, the screen generating unit 153 updates elements performed by the athlete 10 based on the performance-transition flow information when the element performed by the athlete 10 has transitioned to a transition destination with a lower probability. It will be explained using the performance-transition flow information 20 illustrated in FIG. 18 as an example. For example, when the element performed by the athlete 10 after the element corresponding to the node "G3-53" is the element corresponding to the node "G3-70", it has transitioned to one with a lower probability, and the screen generating unit 153 updates the elements performed by the athlete 10. The elements before update and elements after update are the same as those in the processing of updating the D score region 11c.

The screen generating unit 153 calculates the D score corresponding to the elements after update similarly to the processing of updating the D score region 11c. The screen generating unit 153 calculates the E score corresponding to the elements after update similarly to the processing of updating the E score region 11d. The screen generating unit 153 calculates the score after update by totalizing the D score and the E score corresponding to the elements after update.

The screen generating unit 153 enters the calculated score after update in the score region 11e. The screen generating unit 153 may highlight the score in the score region 11e when the newly calculated score is to be displayed. Furthermore, the screen generating unit 153 updates the score in the score table 144 (score of the estimated score) with the calculated score.

One example of the processing of updating the information of the place estimation region 11f by the screen generating unit 153 will be explained. The screen generating unit 153 refers to the score table 144, to acquire a score of the first athlete and scores of the plural second athletes.

The score of the first athlete is a score of the item of the estimated score corresponding to the athlete ID of the athlete currently performing in the score table 144. The score of the second athlete is a score of the score item corresponding to the athlete ID of the second athlete in the score table 144 when a performance of the relevant second athlete has been finished. Alternatively, the score of the second athlete is a score of the item of the estimated score corresponding to the athlete ID of the second athlete in the score table 144 when a performance of the relevant second athlete has not been finished.

The screen generating unit 153 compares the score of the first athlete (estimated score during performance) and the scores of the plural second athletes (scores before performance or after performance), to determine places of the athletes. The screen generating unit 153 associates the place, the name of the athlete, and the score with one another, and thereby generates information for the place estimation region 11f. For example, the screen generating unit 153 refers to a table (not illustrated) in which an athlete ID and an athlete name are associated with each other, to identify the athlete name corresponding to the athlete ID.

The screen generating unit 153 repeats the processing described above each time the score of the first athlete is updated, and thereby updates the information for the place estimation region 11f. When the place of an athlete moves up compared to the place before update, the screen generating unit 153 displays an upward arrow next to the relevant athlete name. When the place of an athlete moves down compared to the place before update, the screen generating unit 153 displays a downward arrow next to the relevant athlete.

Subsequently, the screen generating unit 153 generates information for the display screen 12 "after performance" of the athlete 10, and outputs it to the display unit 130 to be displayed. The display screen 12 includes the video region 12a, the performance list 12b, the D score region 12c, the E score region 12d, the score region 12e, and the place estimation region 12f.

The screen generating unit 153 refers to the element recognition DB 141, to acquire elements that have actually been performed by the athlete 10 sequentially, compares the elements actually performed with the performance-transition flow information, and determines that the performance of the athlete 10 has finished when it reaches the final node in the performance-transition flow information. For example, explaining with the performance-transition flow information 20 illustrated in FIG. 18 as an example, when the element of the athlete 10 reaches the element corresponding to the node "G4-41", it is determined that the performance of the athlete 10 has finished.

The processing of displaying information in the video region 12a by the screen generating unit 153 will be explained. The screen generating unit 153 acquires video data of an athlete that has performed from the video DB 142, and displays the acquired video data in the video region 12a.

The processing of displaying information in the performance list 12b by the screen generating unit 153 will be explained. The screen generating unit 153 uses the information displayed in the performance list 11a of the display screen 11 at a point of time when the athlete 10 finishes the performance, as the information for the performance list 12b.

The processing of displaying information in the D score region 12c, the E score region 12d, and the score region 12e by the screen generating unit 153 will be explained. The screen generating unit 153 sets the D score, the E score, and the score that are set to the D score region 11c, the E score region 11d, and the score region 11e of the display screen 11 at a time when the athlete 10 finishes the performance to the D score region 12c, the E score region 12d, and the score region 12e.

The screen generating unit 153 enters the information of the D score, the E score, and the score set to the D score region 12c, the E score region 12d, and the score region 12e in the item of the score in the score table 144, associating with the athlete ID.

The processing of displaying information in the place estimation region 12f by the screen generating unit 153 will be explained. The screen generating unit 153 refers to the score table 144, and acquires the score of the first athlete and the scores of the second athletes.

The score of the first athlete is the score of the item of scores in the score table 144 corresponding to the athlete ID of the athlete that has finished the performance. The score of the second athlete is the score of the item of scores in the score table 144 corresponding to the athlete ID of the second athlete when the performance of the relevant second athlete has been finished. Alternatively, the score of the second athlete is the score of the item of estimated score in the score table 144 corresponding to the athlete ID of the second athlete when the relevant second athlete has not finished the performance.

The screen generating unit 153 compares the score of the first athlete (estimated score during performance) and the score of the plural second athletes (scores before performance or after performance), to determine the places of the athletes. The screen generating unit 153 associates the place, the name of the athlete, and the score with one another, and thereby generates the information for the place estimation region 12f. For example, the screen generating unit 153 refers to a table (not illustrated) in which an athlete ID and an athlete name are associated with each other, to identify the athlete name corresponding to the athlete ID. Moreover, if there are changes of place of the athletes compared to the latest places, the screen generating unit 153 may visualize the changes of places by indicating directions of arrows. That is, when the place of an athlete moves up compared to the place before update, the screen generating unit 153 displays an upward arrow next to the relevant athlete name. When the place of an athlete moves down compared to the place before update, the screen generating unit 153 displays a downward arrow next to the relevant athlete.

Subsequently, one example of changes of information of the performance transition information 11b, the D score region 11c, the E score region 11d, and the score region 11e of the display screen 11 during a period from a start of performance until an end of performance of the athlete 10 will be explained, using FIG. 20.

Figure 20:
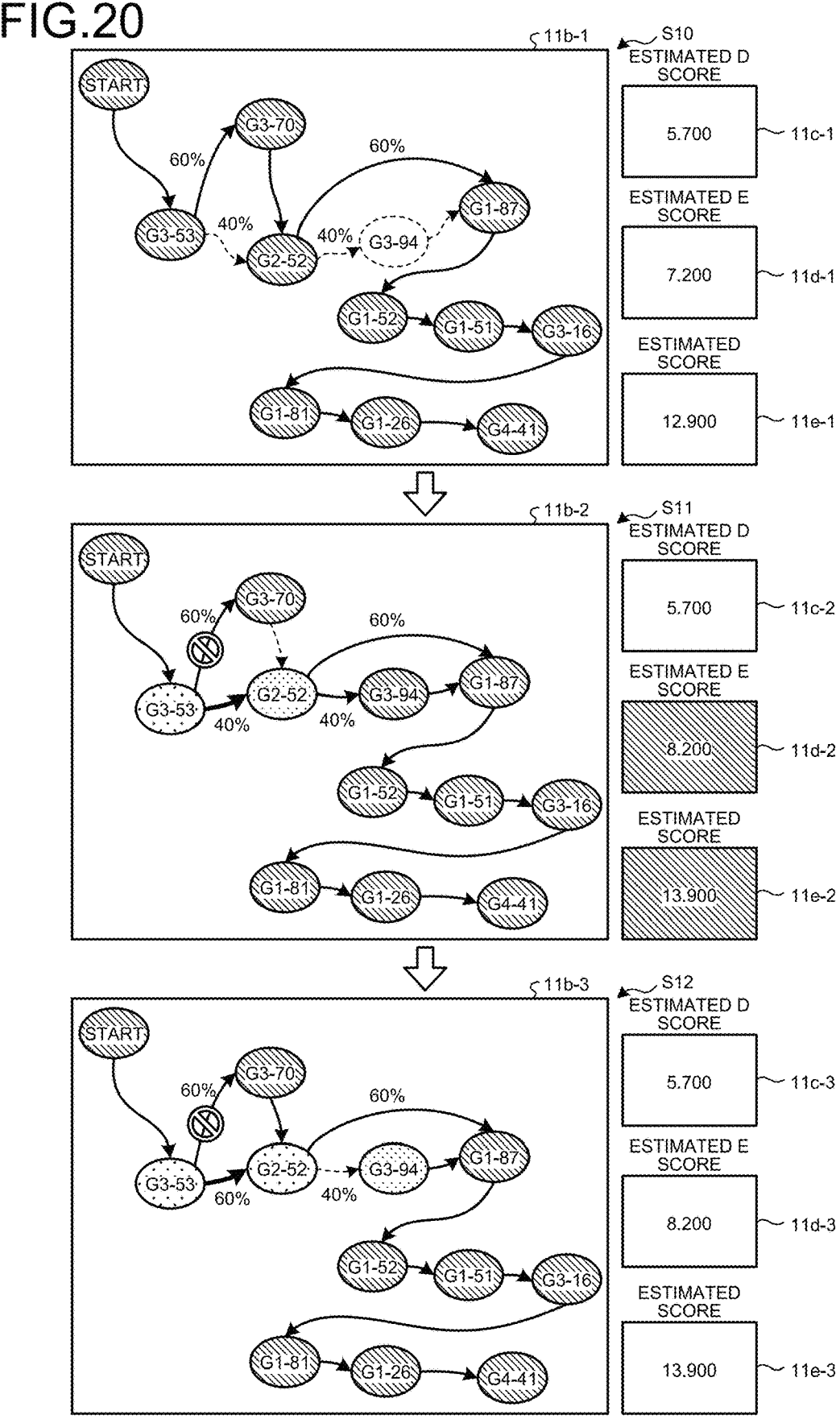
FIG. 20 is a diagram (2) for explaining an example of processing of the screen generating unit according to the first embodiment.

FIG. 20 is a diagram (2) for explaining an example of processing of the screen generating unit according to the first embodiment. In FIG. 20, a case in which the athlete 10 starts a performance, and performs an element (element of "G2-52") different from one planned subsequent to the element "G3-53", and thereafter performs as planned will be explained as an example.

Step S10 will be explained. At step S10, in the display screen before performance, performance transition information 11b-1, a D score region 11c-1, an E score region 11d-1, and a score region 11e-1 are included.

The screen generating unit 153 displays the performance-transition flow information 20 in the performance transition information 11b-1. The screen generating unit 153 calculates the D score, the E score, and the score of the planned performance information, and displays them in the D score region 11c-1, the E score region 11d-1, and the score region 11e-1, respectively. The D score, the E score, and the score displayed in the D score region 11c-1, the E score region 11d-1, and the score region 11e-1 are the D score, the E score, and the score when the athlete 10 performs as planned (performance in the planned performance information).

Step S11 will be explained. At step S11, in the display screen during performance, a D score region 11c-2, an E score region 11d-2, and a score region 11e-2 are included.

The screen generating unit 153 refers to the element recognition DB 141, and when it has transitioned from the element of "G3-53" to the element of "G2-52", highlights a line transitioning from the element of "G3-53" to the element of the "G2-52" in the performance transition information 11b-2. The screen generating unit 153 updates the information for the D score region 11c-1, the E score region 11d-1, and the score region 11e-1. Because the difficulty of the element of "G3-70" and the element of "G2-52" is the same difficulty "D", the D score in the D score region 11c-2 and the D score in the D score region 11c-1 are the same.

By transitioning from the element of "G3-53" to the element of "G2-52", and not performing the element of "G3-70" that has originally been planned to be performed, the E score is updated to "8.200". The screen generating unit 153 displays the E score "8.200" in the E score region 11d-2. Moreover, according to the update of the E score, the screen generating unit 153 displays the score "13.900" in the score region 11e-2.

Step S12 will be explained. At step S12, in the display screen during performance until the end of performance, performance transition information 11b-3, a D score region 11c-3, an E score region 11d-3, and a score region 11e-3 are included. When the athlete 10 performs as it has been planned as for elements subsequent to the element of "G2-52", the screen generating unit 153 displays information same as the D score region 11c-2, the E score region 11d-2, and the score region 11e-2, in the score region 11c-3, the E score region 11d-3, and the score region 11e-3.

Figure 21:
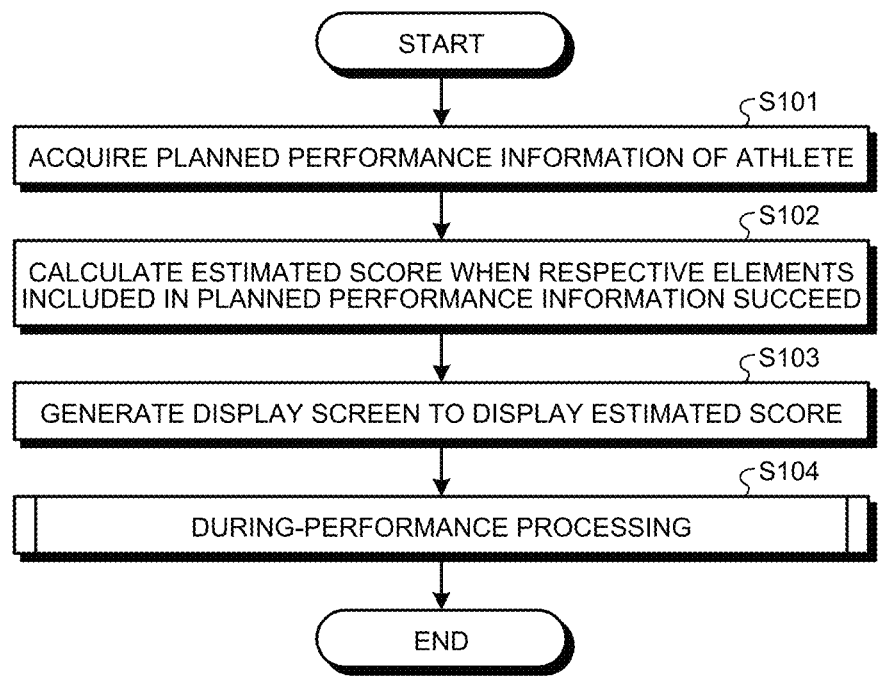
FIG. 21 is a flowchart illustrating a procedure of processing of the information processing apparatus according to the first embodiment.

Next, one example of a procedure of processing of the information processing apparatus 100 according to the first embodiment will be explained. FIG. 21 is a flowchart illustrating a procedure of processing of the information processing apparatus according to the first embodiment. As illustrated in FIG. 21, the preprocessing unit 152 of the information processing apparatus 100 acquires planned performance information from the performance history table 143 (step S101). The preprocessing unit 152 calculates an estimated score in the case in which the respective elements included in the planned performance information succeed. (step S102).

The screen generating unit 153 of the information processing apparatus 100 generates a display screen to display the estimated score, and displays it on the display unit 130 (step S103). For example, the display screen displayed at step S103 corresponds to the display screen 10A explained in FIG. 9. The screen generating unit 153 performs during-performance processing (step S104).

Figure 22:
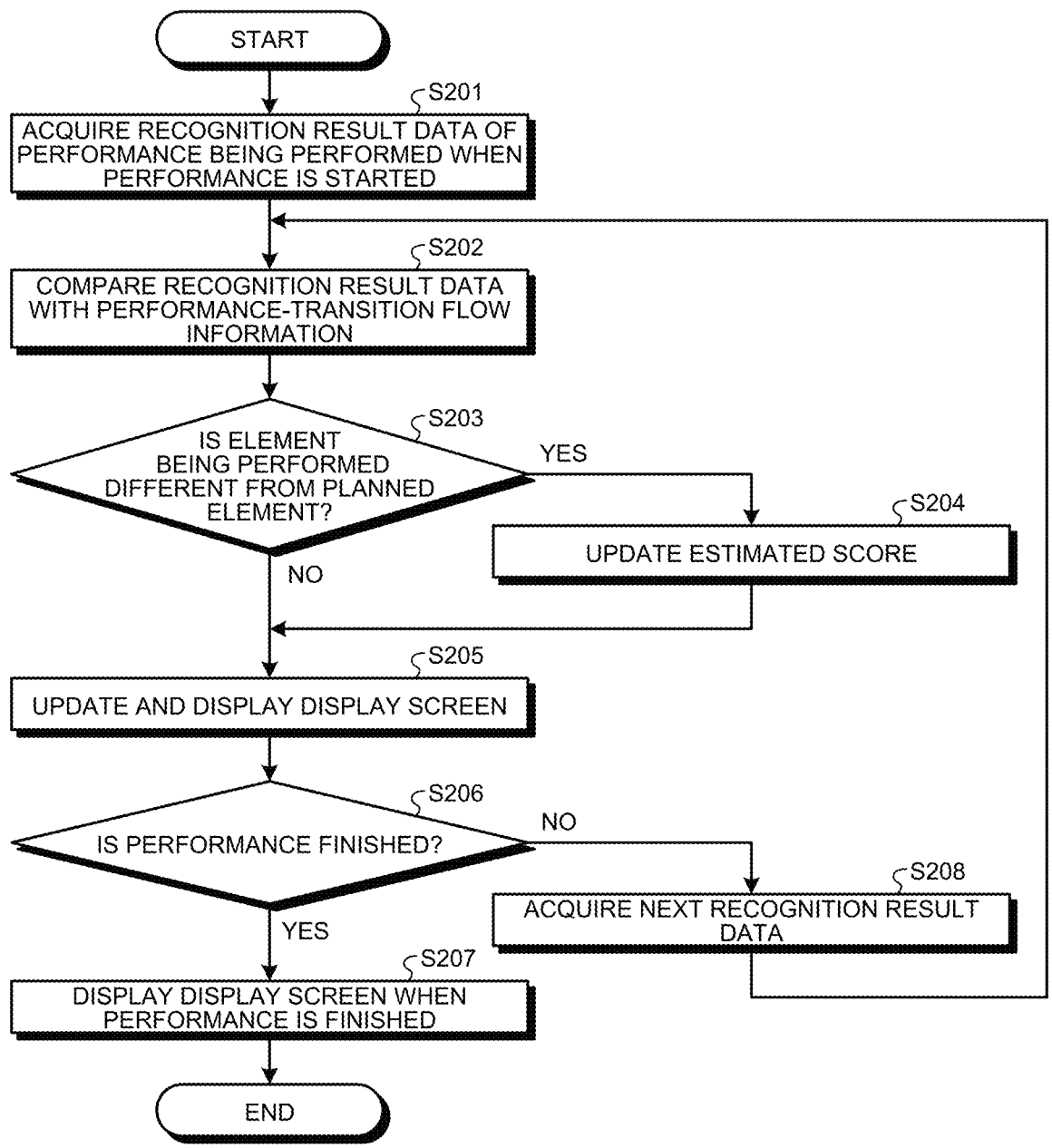
FIG. 22 is a flowchart illustrating a procedure of during-performance processing.

Subsequently, one example of the during-performance processing described in step S104 in FIG. 21 will be explained. FIG. 22 is a flowchart illustrating the procedure of during-performance processing. As illustrated in FIG. 22, the screen generating unit 153 of the information processing apparatus 100 acquires, when a performance of the athlete 10 is started, recognition result data of a performance being performed (step S201).

The screen generating unit 153 compares the recognition result data with the performance-transition flow information (step S202). When an element being performed is different from a planned element (step S203: YES), the screen generating unit 153 updates an estimated score (step S204), and shifts to step S205.

On the other hand, when the element being performed is not different from the planned element (step S203: NO), the screen generating unit 153 shifts to step S205. The screen generating unit 153 updates and displays the display screen (step S205). For example, the display screen displayed at step S205 corresponds to the display screen 11 explained in FIG. 10.

When the performance is finished (step S106: YES), the screen generating unit 153 displays the display screen at the time when the performance is finished (step S207). For example, the display screen displayed at step S207 corresponds to the display screen 12 explained in FIG. 11.

On the other hand, when the performance has not been finished (step S206: NO), the screen generating unit 153 acquires next recognition result data (step S208), and shifts to step S202.

Next, an effect of the information processing apparatus 100 according to the first embodiment will be explained. The information processing apparatus 100 calculates an estimated score for planned performance information before start of performance, and displays the calculated estimated score. When the performance is started, the information processing apparatus 100 determines whether planned elements have been changed as the performance proceeds, and when the planned elements have been changed, updates a series of planned elements by estimating an element that has not been performed yet and has a high probability of being performed, and updates the estimated score based on the updated series of estimated elements, to display the updated estimated score on the display screen. Thus, the estimated score of planned performance, and an estimated score obtained as the performance proceeds in an event scored by judges can be provided.

The information processing apparatus 100 displays the display screen 10A illustrated in FIG. 9 before start of performance of the athlete 10. For example, by referring to the place estimation region 10f of the display screen 10A, an announcer can grasp a score line around which changes of places of athletes occurs. For example, if an athlete that is going to perform from now is "FUJI, Taro", the announcer can easily come up with a comment like, "Because it seems difficult to win the first place with the planned routine, he will probably change the routine", or the like, viewing the display screen.

The information processing apparatus 100 displays the display screen 11 illustrated in FIG. 10 during the performance of the athlete 10. For example, by referring to the performance transition information 11b of the display screen 11, the announcer can understand that the element performed by the athlete 10 has been changed from the element of "G3-70" to the "G2-52" in real time. Moreover, when the E score in the E score region 11d has risen as a result of changing the element from the element of "G3-70" to the element of "G2-52", it is possible to see that the athlete 10 has shifted to his/her forte element. This enables an announcer to easily come up with a comment like, "He has changed the planned element (G3-70) to an element (G2-52) with a higher degree of perfection in the match! This routine got a higher E score by 1.0 in a past performance", or the like, viewing the display screen.

On the other hand, if a viewer refers to the performance transition information 11b in the display screen 11, the viewer can watch the live broadcast with excitement with expectations for a comeback. For example, in the display screen 11 in FIG. 10, when the current element is "G3-53", the viewer can guess that the athlete performs the element of "G3-70" next in advance, even without knowledge about past performance of the athlete 10, and can also enjoy the strategy of the athlete 10, such as whether to challenge for a comeback by changing the element to "G2-52", or the like.

The information processing apparatus 100 displays the display screen 12 illustrated in FIG. 11 at the time when the performance of the athlete 10 finishes. For example, by referring to the information in the place estimation region 12f in the display screen 12, an announcer can grasp an estimated score before announcement of the final score from the judges. For example, it is possible to easily come up with a comment like, "there is a high possibility that FUJI, Taro moves up to the provisional first place", or the like.

Second Embodiment

FIG. 23 is a diagram illustrating an example of a system according to a second embodiment. As illustrated in FIG. 23, this system includes the 3D laser sensor 50, the camera 60, and an information processing apparatus 200. The information processing apparatus 200 is connected to the 3D laser sensor 50 and the camera 60. In the second embodiment, a case in which the athlete 10 gives a gymnastic performance in front of the 3D laser sensor 50 and the camera 60 will be explained as an example, but it is also applicable to a case in which the athlete 10 performs in another kind of event scored by judges similarly.

The 3D laser sensor 50 is a sensor that performs 3D sensing with respect to the athlete 10. The 3D laser sensor 50 outputs 3D sensing data obtained as a resultant of sensing, to the information processing apparatus 200.

The camera 60 is a device that images video data of the athlete 10. The camera 60 outputs the video data to the information processing apparatus 200.

The information processing apparatus 200 is an apparatus that displays an estimated score that is calculated from a series of planned performance of the athlete 10 based on a history of routine that have been performed by the athlete in past. Furthermore, when the performance of the athlete 10 is changed while the actual performance of the athlete 10 proceeds, the information processing apparatus 200 updates the estimated performance thereafter, and updates the estimated score according to a performance update.

Moreover, the information processing apparatus 200 has a function of the element recognition device 70 explained in FIG. 1, and recognizes an element of the athlete 10 based on the sensing data output from the 3D laser sensor 50. When recognizing an element of the athlete 10, the information processing apparatus 200 estimates the element based on a start position identified from the sensing data, to display.

For example, suppose that there are multiple elements to be performed next to an element currently being performed by the athlete 10, and the next elements are "back uprise to Inverted cross (2 seconds)", "back uprise to handstand (2 seconds)", and "another element". Upon determining that the start position identified from the sensing data is of "back uprise", the information processing apparatus 200 can determine that the element to be performed next is either "back uprise to Inverted cross (2 seconds)" or "back uprise to handstand (2 seconds)" without waiting for recognition of the finish position. The information processing apparatus 200 displays estimated "back uprise to Inverted cross (2 seconds)" and "back uprise to handstand (2 seconds)" in the display screen.

FIG. 24 is a diagram illustrating an example of the display screen displayed by the information processing apparatus according to the second embodiment. For example, when determining that the element to be performed next is either "back uprise to Inverted cross (2 seconds)" or "back uprise to handstand (2 seconds)", the information processing apparatus 200 highlights the element names of "back uprise to Inverted cross (2 seconds)" and "back uprise to handstand (2 seconds)" as illustrated in the display screen 13. By referring to this display screen 13, it is possible to be aware of the element that is intended to be performed by the athlete 10 in advance, without looking at the position at the finish.

Figure 25:
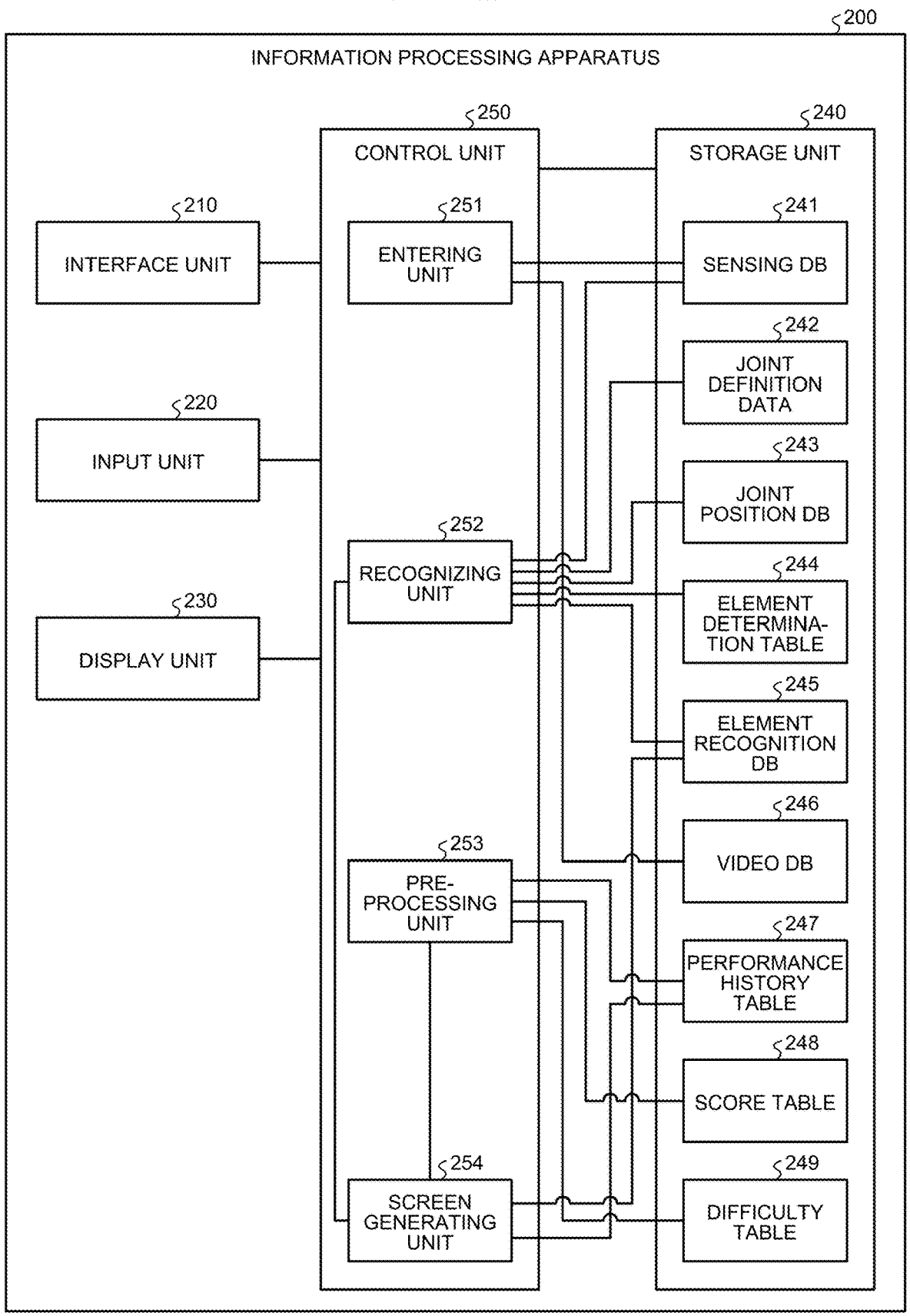
FIG. 25 is a functional block diagram illustrating a configuration of the information processing apparatus according to the second embodiment.

Next, a configuration of the information processing apparatus 200 according to the second embodiment will be explained. FIG. 25 is a functional block diagram illustrating the configuration of the information processing apparatus according to the second embodiment. As illustrated in FIG. 25, the information processing apparatus 200 includes an interface unit 210, an input unit 220, a display unit 230, a storage unit 240, and a control unit 250.

The interface unit 210 is a device that is connected to the 3D laser sensor 50 and the camera 60, and that acquires data from the 3D laser sensor 50 and the camera 60. The interface unit 210 outputs the acquired data to the control unit 250. For example, the interface unit 210 acquires sensing data from the 3D laser sensor 50. The interface unit 210 acquires video data from the camera 60.

The input unit 220 is an input device to input various kinds of information to the information processing apparatus 200. The input unit 220 corresponds to a keyboard, a mouse, a touch panel, and the like.

The display unit 230 is a display device that displays information of a display screen output from the control unit 250. The display unit 240 corresponds to a liquid crystal display, a touch panel, and the like. For example, the display unit 230 displays the display screens illustrated in FIG. 9 to FIG. 10.

The storage unit 240 includes a sensing DB 241, joint definition data 242, a joint position DB 243, an element determination table 244, and an element recognition DB 245. Moreover, the storage unit 240 includes a video DB 246, a performance history table 247, a score table 248, and a difficulty table 249. The storage unit 240 corresponds to a semiconductor memory device, such as a RAM, a ROM, and a flash memory, or a storage device, such as an HDD.

The sensing DB 241 is a DB that stores sensing data acquired from the 3D laser sensor 50. A data structure of the sensing DB 241 is the same as the data structure of the sensing DB 71 explained in the first embodiment.

The joint definition data 242 is to define each joint position of the athlete 10. A data structure of the joint definition data 242 is the same as the data structure of the joint definition data 72 explained in the first embodiment.

The joint position DB 243 is position data of the respective points of the athlete 10 generated based on the sensing data of the 3D laser sensor 50. A data structure of the joint position DB 243 is the same as the data structure of the joint position DB 73 explained in the first embodiment.

The element determination table 244 is a table that is used when determining an element performed by the athlete 10. A data structure of the element determination table 244 is the same as the data structure of the element determination table 74 explained in the first embodiment.

The element recognition DB 245 is a DB that stores element recognition result. A data structure of the element recognition DB 245 is the same as the data structure of the element recognition DB 75 explained in the first embodiment.

The video DB 246 is a DB that stores video data acquired from the camera 60. A data structure of the video DB 246 is the same as the data structure of the video DB 142 explained in the first embodiment.

The performance history table 247 is a table that holds information regarding a history of performance that has been performed in past by the athlete 10 or other athletes. A data structure of the performance history table 247 is the same as the data structure of the performance history table 143 explained in the first embodiment.

The score table 248 is a table that holds information regarding scores of respective athletes. A data structure of the score table 248 is the same as the data structure of the score table 144 explained in the first embodiment.

The difficulty table 249 is a table in which the difficulty used when calculating the D score, and the score are associated with each other. A data structure of the difficulty table 249 is the same as the difficulty table 145 explained in the first embodiment.

The control unit 250 includes an entering unit 251, a recognizing unit 252, a preprocessing unit 253, and a screen generating unit 254. The control unit 250 can be implemented by a CPU, an MPU, or the like. Moreover, the control unit 250 can also be implemented by hard wired logic, such as an ASIC and an FPGA.

The entering unit 251 acquires sensing data from the 3D laser sensor 50, and enters the acquired sensing data in the sensing DB 241. The entering unit 251 acquires video data from the camera 60, and enters the acquired video data in the video DB 246.

The recognizing unit 252 is a processing unit that recognizes an element of the athlete 10 based on the sensing data stored in the sensing DB 241. The recognizing unit 252 generates recognition result data in which respective frame numbers of sensing data and respective recognition results are associated with each other. The recognizing unit 252 stores the recognition result data in the element recognition DB 245.

The recognizing unit 252 compares a sensing frame of the sensing DB 241 and positional relationship of respective joints defined by the joint definition data 242, to identify types of respective joints included in the sensing frame and three-dimensional coordinates of the joints. The recognizing unit 252 repeats the above processing for respective frame numbers of sensing DB 241, and stores information of the three-dimensional coordinates of the respective joints in the joint position DB 243.

The recognizing unit 252 compares the information of the three-dimensional coordinates of the respective joints with the element determination table 244 for each frame number, to identify a start position and a finish position. Moreover, the recognizing unit 252 compares a combination of the identified start position and finish position with the element determination table 244, to identify an element group, an element number, and an element name corresponding to the frame number.

The recognizing unit 252 stores information in which the frame number, the joint position data, the start position flag, the finish position flag, the element group, the element number, and the element name are associated with one another in the element recognition DB 245.

The recognizing unit 252 according to the second embodiment may be configured to estimate an element based on the start position identified from the sensing data, when recognition of an element is performed based on the sensing data stored in the sensing DB 241. The recognizing unit 252 outputs the information about the element estimated from the start position to the screen generating unit 254.

Figure 26:
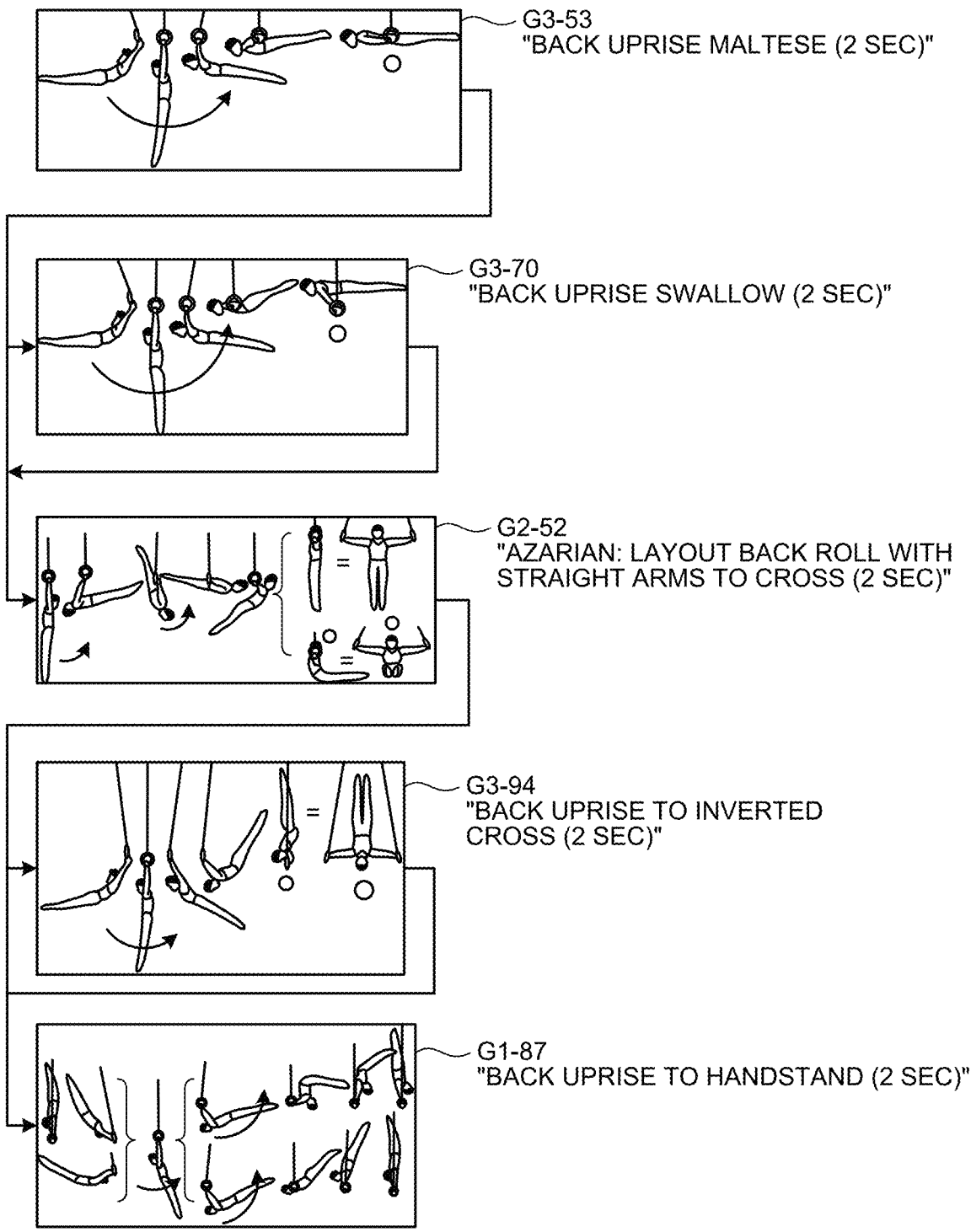
FIG. 26 is a diagram for explaining processing of a recognizing unit according to the second embodiment.

FIG. 26 is a diagram for explaining processing of the recognizing unit according to the second embodiment. For example, the recognizing unit 252 determines a transition destination of each element as illustrated in FIG. 26 based on the performance-transition flow information. As illustrated in FIG. 26, after the element of "back uprise maltese (2 seconds)", "back uprise swallow (2 seconds)" or "Azarian: layout back roll with straight arms to cross (2 seconds)" are performed. Furthermore, after "Azarian", "back uprise to inverted cross (2 seconds)" or "back uprise to handstand (2 seconds)" is performed.

As explained in FIG. 7, elements are determined by a combination of a start position and a finish position. However, if a start position can be determined without waiting for determination of a finish position, an element to be performed next by the athlete 10 can be estimated. For example, in FIG. 26, when the element "back uprise maltese (2 seconds)" of the athlete 10 is finished, a possible element to be performed next by the athlete 10 is "back uprise swallow (2 seconds)" or "Azarian".

Therefore, when the element "back uprise maltese (2 seconds" of the athlete 10 is finished, and a start position of "back uprise" is taken, the recognizing unit 252 estimates that the next element is "back uprise swallow (2 seconds)". On the other hand, when the element "back uprise maltese (2 seconds" of the athlete 10 is finished, and a start position of "layout back roll with straight arms" is taken, the recognizing unit 252 estimates that the next element is "Azarian".

When the element "Azarian" of the athlete 10 is finished, and a start position of "back uprise" is taken, the recognizing unit 252 estimates that "back uprise to inverted cross (2 seconds)" or "back uprise to handstand (2 seconds)" is to be performed, not other elements.

It is noted that there is a rule that the same element is not performed twice in gymnastics. Therefore, if an estimated element has already been performed in the routine, the recognizing unit 252 may perform processing of excluding the element from an estimation result. For example, when the element "Azarian" of the athlete 10 is finished, and the athlete 10 takes a start position of "back uprise", the recognizing unit 252 estimates that "back uprise to inverted cross (2 seconds)" or "back uprise to handstand (2 seconds)" is to be performed. However, if "back uprise to inverted cross (2 seconds)" has already been performed, the recognizing unit 252 estimates the element to be performed next as "back uprise to handstand (2 seconds)".

The preprocessing unit 253 generates the "planned performance information" and the "performance-transition flow information" based on the performance history table 247. The preprocessing unit 253 outputs the planned performance information and the performance-transition flow information to the screen generating unit 254.

The preprocessing unit 253 calculates an estimated score when the elements are successfully performed from the planned performance information, and generates screen information to display the estimated score of the estimated performance. For example, the screen information to display the estimated score of the estimated performance corresponds to the display screen 10A explained in FIG. 9. The other processing regarding the preprocessing unit 253 are the same as the processing of the preprocessing unit 152 explained in FIG. 9 and, therefore, explanation thereof is omitted.

The screen generating unit 254 generates information for the display screen 10A illustrated in FIG. 9 before start of performance of the athlete 10, and outputs it to the display unit 230 to be displayed. The screen generating unit 254 generates information for the display screen 11 illustrated in FIG. 10 during a performance of the athlete 10, and outputs it to the display unit 230 to be displayed. The screen generating unit 254 generates information for the display screen illustrated in FIG. 11 after the performance of the athlete 10 is finished, and outputs it to the display unit 230 to be displayed.

The processing of generating screens of the display screens 10A, 11, and 12 by the screen generating unit 254 is the same as the processing of the screen generating unit 153 explained in the first embodiment and, therefore, explanation thereof is omitted. When the screen generating unit 254 generates the display screen 11 during a performance, the performance list 11a, the performance transition information 11b, the D score region 11c, the E score region 11d, the score region 11e, and the place estimation region 11f may be updated by using the elements estimated by the recognizing unit 252.

When receiving information about an element estimated by the recognizing unit 252, the screen generating unit 254 displays the information about the estimated element on the display unit 230. For example, the screen generating unit 254 displays information about an element with a high possibility to be performed next by displaying the display screen 13 explained in FIG. 24, without waiting for a finish position.

Moreover, the screen generating unit 254 may estimate and display remaining performance time when displaying the display screen during a performance. For example, the screen generating unit 254 refers to the performance history table 247, and compares past performance routine information of the athlete 10 with the planned performance information, to identify planned performance time. The screen generating unit 254 counts elapsed time from a start of performance by the athlete 10 by using a not illustrated timer, and estimates remaining performance time by subtracting elapsed time from the planned performance time.

Figure 27:
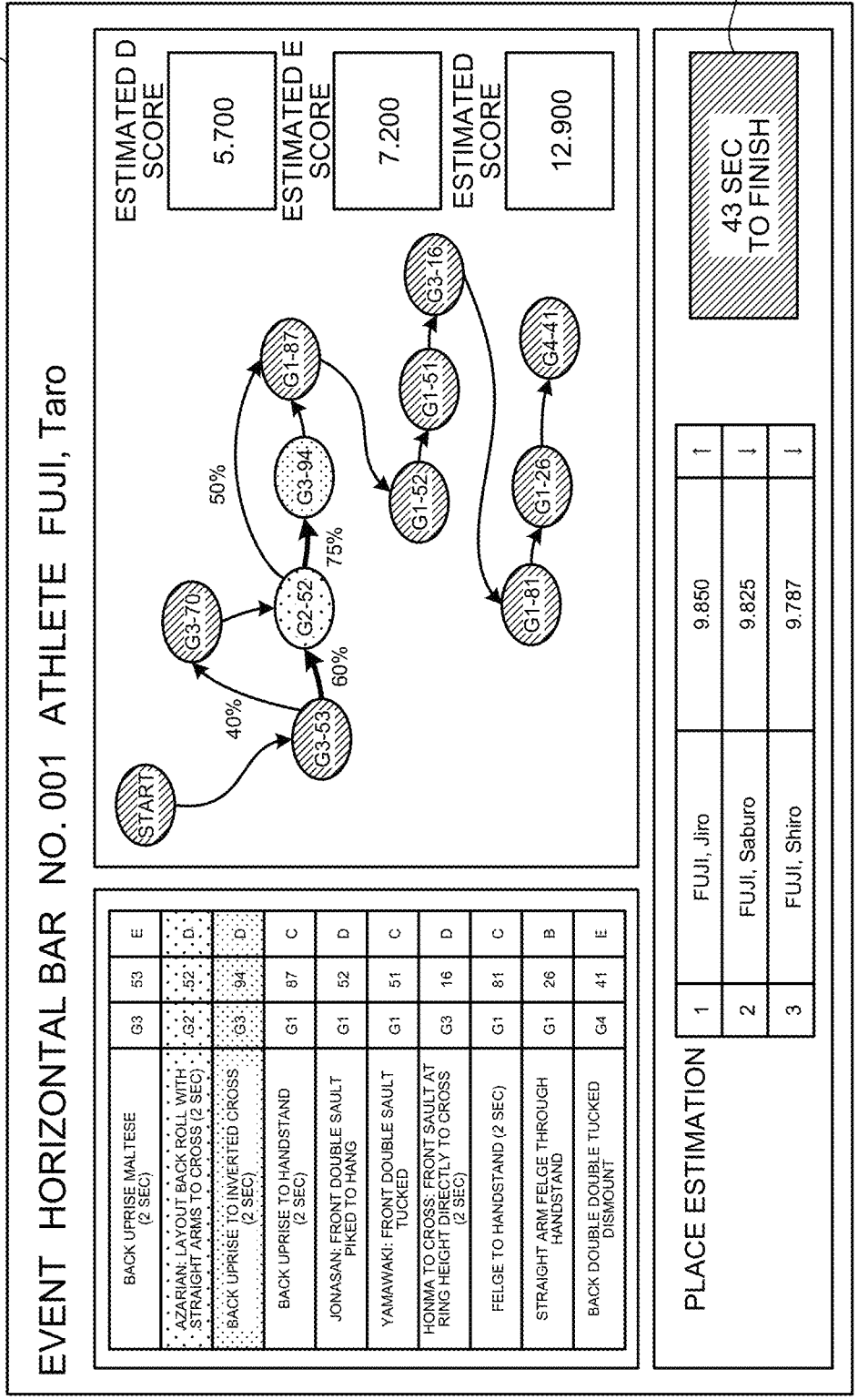
FIG. 27 is a diagram illustrating an example of a display screen during performance according to the second embodiment.

FIG. 27 is a diagram illustrating an example of the display screen during performance according to the second embodiment. As illustrated in FIG. 27, a display region 14a is included in a display screen 14. The screen generating unit 254 displays the remaining performance time in the display region 14a.

Figure 28:
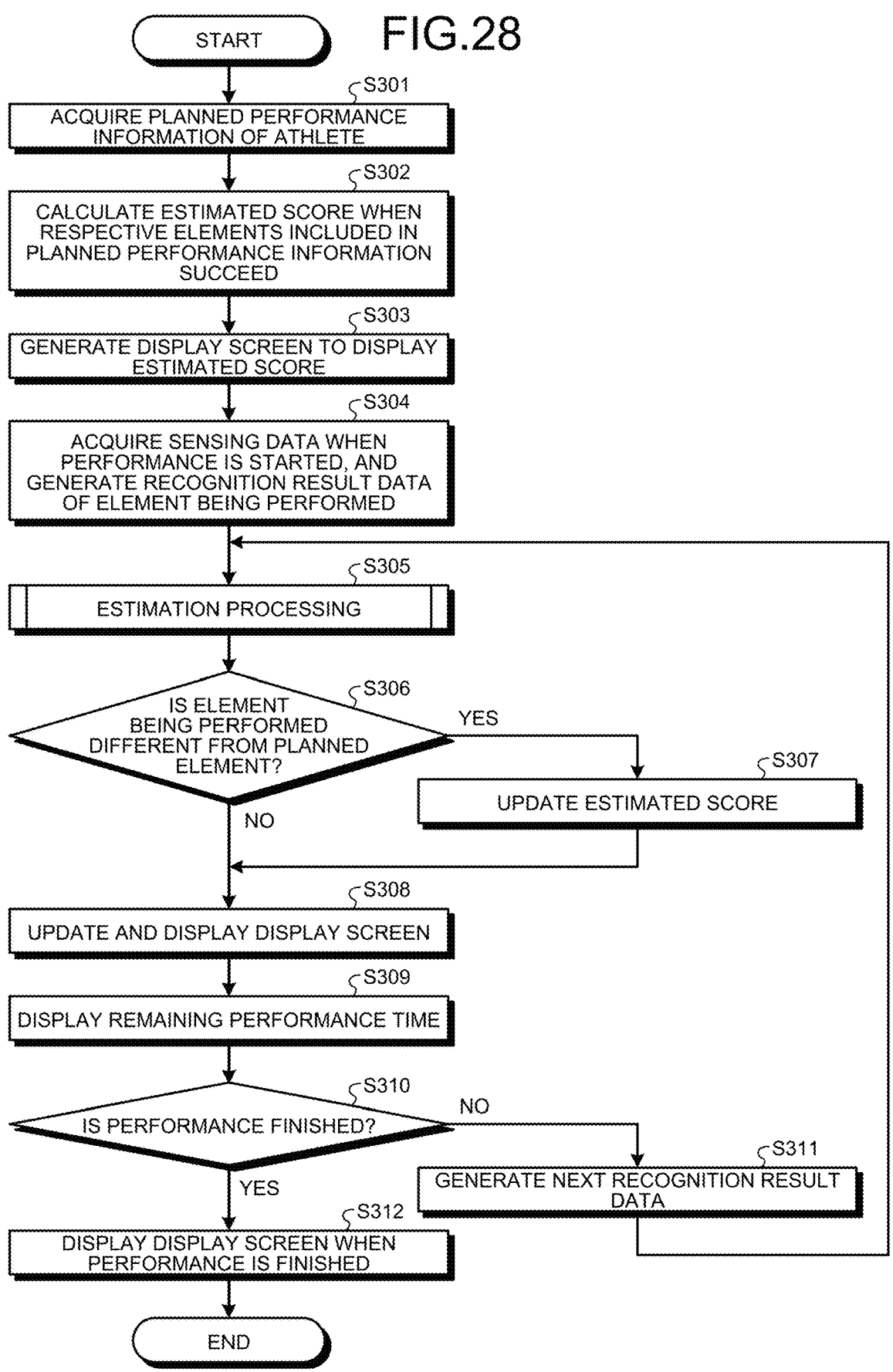
FIG. 28 is a flowchart illustrating a procedure of processing of the information processing apparatus according to the second embodiment.

Next, one example of a procedure of processing of the information processing apparatus 200 according to the second embodiment will be explained. FIG. 28 is a flowchart illustrating a procedure of the processing of the information processing apparatus according to the second embodiment. As illustrated in FIG. 28, the preprocessing unit 253 of the information processing apparatus 200 acquires the planned performance information of the athlete 10 from the performance history table 247 (step S301). The preprocessing unit 253 calculates an estimated score when the respective elements included in the planned performance information succeed. (step S302).

The screen generating unit 254 of the information processing apparatus 200 generates a display screen to display the estimated score, and displays it on the display unit 130 (step S303). When a performance of the athlete 10 is started, the information processing apparatus 100 acquires sensing data, and generates recognition result data of a performance being performed (step S304).

The recognizing unit 252 of the information processing apparatus 200 performs estimation processing (step S305). When an element being performed is different from the planned element (step S306: YES), the screen generating unit 254 updates an estimated score (step S307), and shifts to step S308.

On the other hand, when the element being performed is not different from the planned element (step S306: NO), the screen generating unit 254 shifts to step S308. The screen generating unit 254 updates and displays the display screen (step S308). For example, the display screen displayed at step S308 corresponds to the display screen 11 explained in FIG. 10.

The screen generating unit 254 displays remaining performance time in the display screen (step S309). When the performance has not been finished (step S310: NO), the screen generating unit 254 generates next recognition result data (step S311), and shifts to step S305.

On the other hand, when the performance is finished (step S310: YES), the screen generating unit 254 displays the display screen at the time when a performance is finished (step S312).

Figure 29:
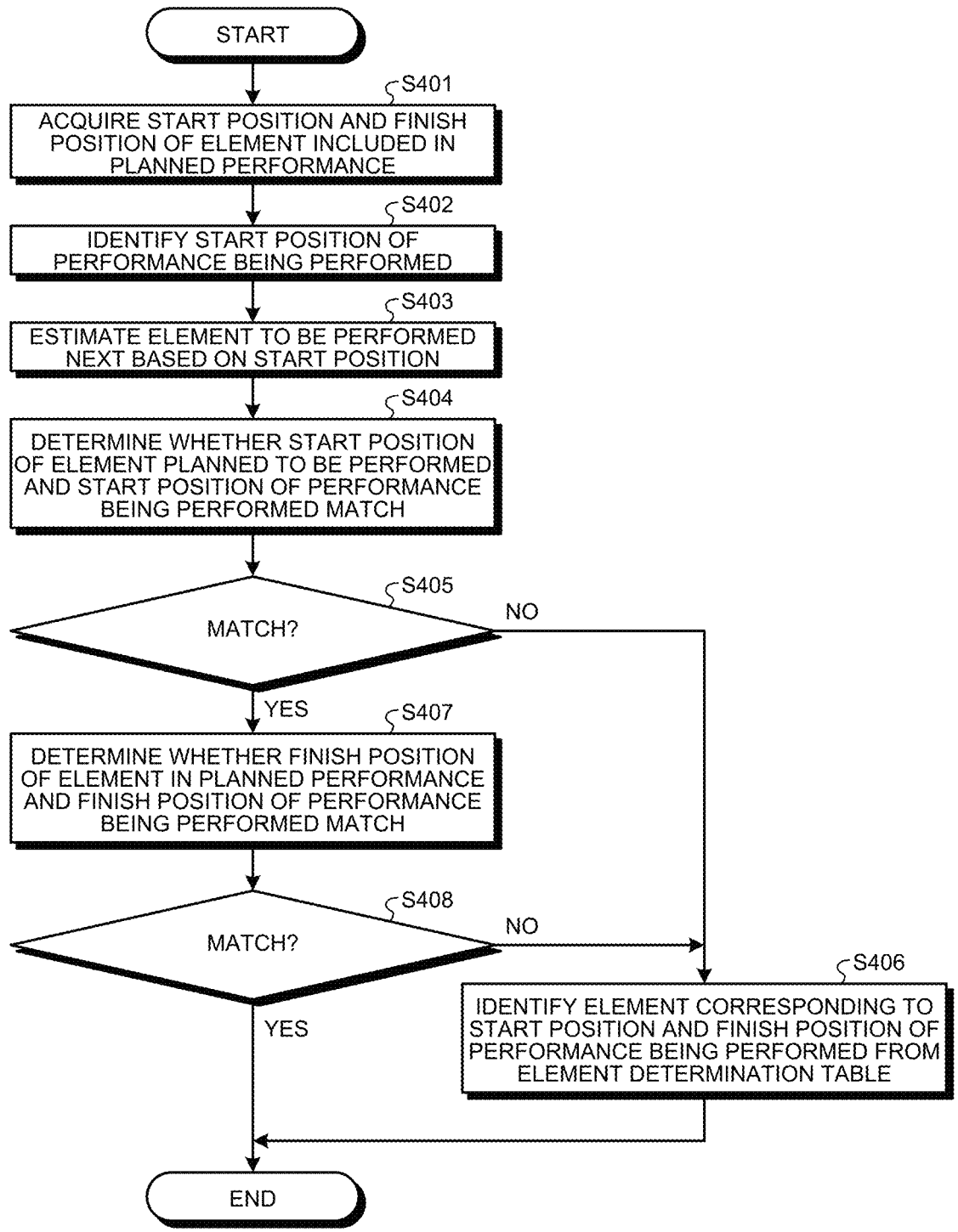
FIG. 29 is a flowchart illustrating an example of estimation processing.

Next, one example of the estimation processing described at step S305 in FIG. 28 will be explained. FIG. 29 is a flowchart illustrating an example of the estimation processing. As illustrated in FIG. 29, the recognizing unit 252 of the information processing apparatus 200 acquires a start position and a finish position of an element planned to be performed (step S401). The recognizing unit 252 identifies the start position of the element being performed (step S402).

The recognizing unit 252 estimates an element to be performed next based on the start position (step S403). The recognizing unit 252 determines whether the start position of the element planned to be performed and the start position of the element being performed match (step S404).

When they do not match (step S405: NO), the recognizing unit 252 identifies an element corresponding to the start position and the finish position of the element being performed from the element determination table 244 (step S406), and ends the estimation processing.

On the other hand, when they match (step S405: YES), the recognizing unit 252 determines whether the finish position of the element planned to be performed and the finish position of the element being performed match (step S407). When they do not match (step S408: NO), the recognizing unit 252 shifts to step S406. When they match (step S408: YES), the recognizing unit 262 ends the estimation processing.

Next, an effect of the information processing apparatus 200 according to the second embodiment will be explained. The information processing apparatus 200 performs processing of determining a start position of an element based on sensing data, and displaying an estimated element in the display screen before a finish position is recognized. This enables an announcer or a viewer that refers to the display screen to be aware of an element to be performed by the athlete 10 in advance.

Moreover, the information processing apparatus 200 estimates performance time of the athlete 10 from past performance routine of the athlete 10, and calculates and displays remaining time when the athlete 10 starts a performance. This enables an announcer to give a live broadcast, knowing remaining performance time. For example, being aware of remaining time, an announcer can adjust the speed or the like to read a manuscript.

Figure 30:
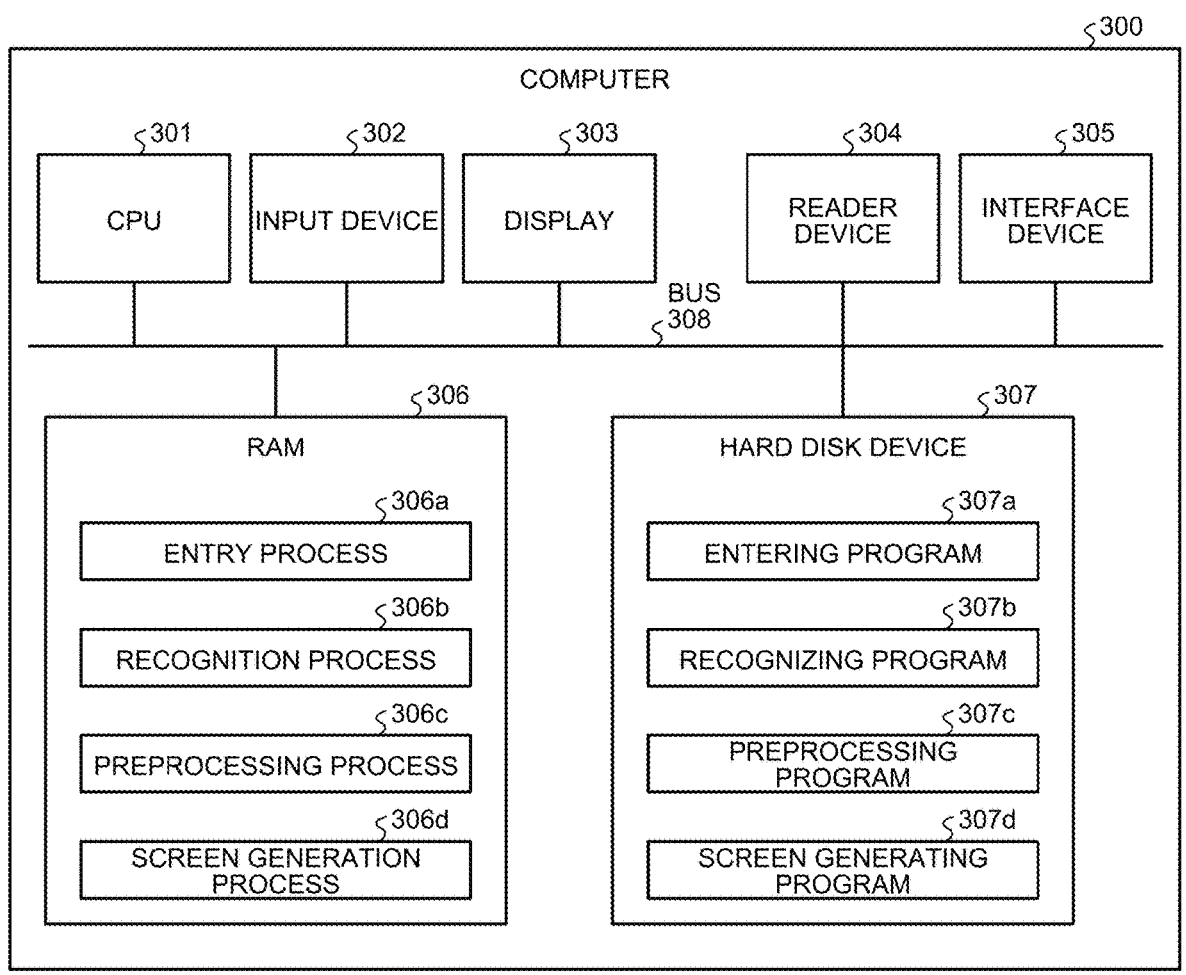
FIG. 30 is a diagram illustrating an example of a hardware configuration of a computer that implements functions similar to those of the information processing apparatus.

Next, one example of a hardware configuration of a computer that implements functions similar to those of the information processing apparatuses 100, 200 described in the above embodiments will be explained. FIG. 30 is a diagram illustrating an example of a hardware configuration of the computer that implements functions similar to those of the information processing apparatus.

As illustrated in FIG. 30, a computer 300 includes a CPU 301 that performs various kinds of arithmetic processing, an input device 302 that receives an input of data from a user, and a display 303. Moreover, the computer 300 includes a reader device 304 that reads a program and the like from a storage medium, and an interface device 305 that communicates data with a recording device, and the like through a wired or wireless network. Furthermore, the computer 300 includes a RAM 306 that temporarily stores various kinds of information, and a hard disk device 307. The respective devices 301 to 307 are connected to the bus 308.

The hard disk device 507 includes an entering program 307a, a recognizing program 307b, a preprocessing program 307c, and a screen generating program 307d. The CPU 301 reads the respective programs 307a to 307d, to expand them on the RAM 306.

The entering program 307a functions as an entry process 306a. The recognizing program 307b functions as a recognition process 306b. The preprocessing program 307c functions as a preprocessing process 306c. The screen generating program 307d functions as a screen generation process 306d.

Processing of the entry process 306a corresponds to the processing of the entering units 151, 251. Processing of the recognition process 306b corresponds to the processing of recognizing unit 252. Processing of the preprocessing process 306c corresponds to the processing of the preprocessing units 152, 253. Processing of the screen generation process 306d corresponds to the processing of the screen generating units 153, 254.

The respective programs 307a to 307d are not necessarily required to be stored in the hard disk device 507 from the beginning. For example, the respective programs are stored on a "portable physical medium", such as a flexible disk (FD), a CD-ROM, a DVD, a magneto optical disk, and an IC card that is inserted into the computer 300, and the computer 300 may be configured to read and execute the respective programs 307a to 307d therefrom.

An estimated score of a planned performance and an estimated score as a performance proceeds in an event scored by judges can be provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable recording medium having stored therein a screen generating program that causes a computer to execute a process comprising:
   acquiring planned performance information that includes a plurality of elements to be sequentially performed by an athlete in a sport event scored by judges, based on a performance history table stored in a storage unit;
   calculating an estimated score in a case in which each of the elements meets requirements defined in an element determination table stored in the storage unit based on the performance history table and a difficulty table stored in the storage unit including the elements included in the planned performance information;
   generating screen information to display the estimated score of the planned performance information;
   acquiring a first element that is actually being performed in a performance by the athlete, by recognizing a start position of the athlete at a time of start of the first element based on three-dimensional coordinates of joints thereof acquired based on data acquired by sensing the performance using a 3D laser sensor, and an element determination table stored in the storage unit;
   updating the estimated score, when the acquired first element is different from a second element sequentially to be performed in place of the first element in the planned performance information, based on the acquired first element, the difficulty table and the performance history table; and
   generating screen information to display the updated estimated score.

2. The non-transitory computer readable recording medium according to claim 1, the process further comprising:
   estimating places of the athlete and other athletes based on the updated estimated score and scores of other athletes; and
   displaying information of the estimated places.

3. The non-transitory computer readable recording medium according to claim 1, the process further comprising:
   estimating performance time from when the athlete starts the performance until the athlete finishes the performance based on the planned performance information; and
   calculating remaining time of the performance based on the estimated performance time, wherein
   the generating includes information about the calculated remaining time of the performance in the screen information.

4. A screen generating method comprising:
   acquiring planned performance information that includes a plurality of elements to be sequentially performed by an athlete in a sport event scored by judges, based on a performance history table stored in a storage unit;
   calculating an estimated score in a case in which each of the elements meets requirements defined in an element determination table stored in the storage unit, based on the performance history table and a difficulty table stored in the storage unit including the elements included in the planned performance information, using a processor;
   generating screen information to display the estimated score of the planned performance information, using the processor;
   acquiring a first element that is actually being performed in a performance by the athlete, by recognizing a start position of the athlete at a time of start of the first element based on three-dimensional coordinates of joints thereof acquired based on data acquired by sensing the performance using a 3D laser sensor, and an element determination table stored in the storage unit, using the processor;
   updating the estimated score, when the acquired first element is different from a second element sequentially to be performed in place of the first element in the planned performance information, based on the acquired first element, the difficulty table and the performance history table, using the processor; and
   generating screen information to display the updated estimated score, using the processor.

5. The screen generating method according to claim 4, further comprising:
   estimating places of the athlete and other athletes based on the updated estimated score and scores of other athletes; and
   displaying information of the estimated places.

6. The screen generating method according to claim 4, further comprising:
   estimating performance time from when the athlete starts the performance until the athlete finishes the performance based on the planned performance information; and
   calculating remaining time of the performance based on the estimated performance time, wherein
   the generating includes information about the calculated remaining time of the performance in the screen information.

7. An information processing apparatus comprising:
   a processor configured to:
   acquire planned performance information that includes a plurality of elements to be sequentially performed by an athlete in a sport event scored by judges, based on a performance history table stored in a storage unit;
   calculate an estimated score in a case in which each of the elements meets requirements defined in an element determination table stored in the storage unit, based on the performance history table and a difficulty table stored in the storage unit including the elements included in the planned performance information;
   generate screen information to display the estimated score of the planned performance information;
   acquire first element that is actually being performed in a performance by the athlete, by recognizing a start position of the athlete at a time of start of the first element based on three-dimensional coordinates of joints thereof acquired based on data acquired by sensing the performance using a 3D laser sensor, and an element determination table stored in the storage unit;

update the estimated score, when the acquired first element is different from a second element sequentially to be performed in place of the first element in the planned performance information, based on the acquired first element, the difficulty table and the performance history table; and generate screen information to display the updated estimated score.

8. The information processing apparatus according to claim 7, the processor further configured to estimate places of the athlete and other athletes based on the updated estimated score and scores of other athletes, and display information of the estimated places.

9. The information processing apparatus according to claim 7, the processor further configured to estimate performance time from when the athlete starts the performance until the athlete finishes the performance based on the planned performance information, calculate remaining time of the performance based on the estimated performance time, and include information about the calculated remaining time of the performance in the screen information.

* * * * *